US012602994B2

(12) United States Patent
Sabatini et al.

(10) Patent No.: US 12,602,994 B2

(45) Date of Patent: Apr. 14, 2026

(54) ESTIMATING ACCIDENT RISK LEVEL OF ROAD TRAFFIC PARTICIPANTS

(71) Applicant: Shenzhen Yinwang Intelligent Technologies Co., Ltd., Shenzhen (CN)

(72) Inventors: Stefano Sabatini, Boulogne Billancourt (FR); Thomas Gilles, Boulogne Billancourt (FR); Dzmitry Tsishkou, Boulogne Billancourt (FR); Tao Yin, Shenzhen (CN)

(73) Assignee: Shenzhen Yinwang Intelligent Technologies Co., Ltd., Shenzhen (CN)

(*) Notice: Subject to any disclaimer, the term of this patent is extended or adjusted under 35 U.S.C. 154(b) by 212 days.

(21) Appl. No.: 18/323,249

(22) Filed: May 24, 2023

(65) Prior Publication Data

US 2023/0306838 A1 Sep. 28, 2023

Related U.S. Application Data

(63) Continuation of application No. PCT/EP2020/083178, filed on Nov. 24, 2020.

(51) Int. Cl.

*G08G 1/01* (2006.01)
*G08G 1/16* (2006.01)

(52) U.S. Cl.

CPC ......... *G08G 1/0129* (2013.01); *G08G 1/0112* (2013.01); *G08G 1/0137* (2013.01); *G08G 1/166* (2013.01)

(58) Field of Classification Search

CPC .. G08G 1/0129; G08G 1/0112; G08G 1/0137; G08G 1/166; G08G 1/64; G08G 1/0962; G06Q 10/0635; G06Q 50/40; G06Q 40/08

See application file for complete search history.

(56) References Cited

U.S. PATENT DOCUMENTS

| | | | | |
|---|---|---|---|---|
| 9,619,203 | B2 * | 4/2017 | Tamir | G07C 5/008 |
| 10,096,070 | B1 * | 10/2018 | Slusar | G06Q 40/08 |
| 12,160,804 | B2 * | 12/2024 | Ahmad | H04W 4/46 |

(Continued)

FOREIGN PATENT DOCUMENTS

| | | | |
|---|---|---|---|
| AU | 2006256372 | B2 | 10/2009 |
| EP | 2289754 | A1 | 3/2011 |

*Primary Examiner* — Christopher George Fees

(74) *Attorney, Agent, or Firm* — Leydig, Voit & Mayer, Ltd.

(57) ABSTRACT

A method of estimating an accident risk level of a first traffic participant based on interactions or negotiations of the first traffic participant with one or more other traffic participants is provided. The method includes generating a plurality of virtual trajectories of the first traffic participant based on a recorded initial position, a recorded final position of the first traffic participant, and a recorded initial position of each of the one or more other traffic participants. The plurality of virtual trajectories of the first traffic participant are associated with a plurality of virtual behaviors of the first traffic participant. The method further includes identifying a virtual trajectory that is most similar to a recorded trajectory of the first traffic participant. The method enables an automatic interpretation of an actual maneuver of the first traffic participant based on the virtual behavior of first traffic participant associated with the identified virtual trajectory.

19 Claims, 20 Drawing Sheets

(56) References Cited

U.S. PATENT DOCUMENTS

| | | | | |
|---|---|---|---|---|
| 12,162,505 | B2 * | 12/2024 | Seitz | B60K 35/10 |
| 2009/0326796 | A1 | 12/2009 | Prokhorov | |
| 2012/0143488 | A1 * | 6/2012 | Othmezouri | G06V 20/58 701/301 |
| 2015/0344030 | A1 * | 12/2015 | Damerow | G06V 20/588 701/1 |
| 2018/0180428 | A1 * | 6/2018 | Grimm | G08G 3/02 |
| 2018/0231974 | A1 * | 8/2018 | Eggert | B60W 30/085 |
| 2019/0126932 | A1 * | 5/2019 | Nishimura | B60W 40/04 |
| 2020/0023842 | A1 * | 1/2020 | Gutierrez | G06V 20/58 |
| 2020/0231149 | A1 * | 7/2020 | Eggert | G08G 1/166 |
| 2021/0253128 | A1 * | 8/2021 | Nister | G05D 1/646 |
| 2021/0366274 | A1 * | 11/2021 | Juhasz | B60W 30/0953 |

* cited by examiner

ESTIMATING ACCIDENT RISK LEVEL OF ROAD TRAFFIC PARTICIPANTS

CROSS-REFERENCE TO RELATED APPLICATIONS

This application is a continuation of International Application No. PCT/EP2020/083178, filed on Nov. 24, 2020, the disclosure of which is hereby incorporated by reference in its entirety.

FIELD

The present disclosure relates generally to the field of traffic monitoring systems, and more specifically, to a method of estimating an accident risk level of a road traffic participant.

BACKGROUND

With the increase in traffic density, there is an increase in road congestion and accidents. Traffic monitoring in this scenario is thus a big challenge. There are many techniques and applications of traffic monitoring, and knowing past driving behavior of a user is also considered useful in assessing risk of accidents. For example, one of the goal of automotive insurance providers is to set an insurance policy price (premium) that is correlated to the risk of losses recognizable under a policy holder (who may also be referred to as a user or a driver). In this perspective, it is well understood that past driving behavior of a user can help to predict a likelihood of car accident, and thus causing a loss to the insurance providers.

Currently, certain attempts have been made in order to determine the past driving behavior of a user, by installation of a conventional sensor set-up (or a sensor box) on a conventional automotive vehicle. The conventional sensor set-up includes a global navigation satellite system (GNSS) receiver, an accelerometer, an inertial measuring unit (IMU), or an exteroceptive sensor (e.g. camera, radar) which is used to estimate an accident risk level (also known as a collision risk level) of the user. The accident risk level (or collision risk level) of the user is estimated by use of the conventional sensor set-up based on two conventional approaches. A first conventional approach is used to detect safety critical events based on direct processing of the conventional sensor set-up (e.g. the accelerometer). The first conventional approach relies in identifying any hard acceleration or breaking during a naturalistic driving of the user. However, the first conventional approach manifests disadvantages of less explainability about a correlation of the hard acceleration or breaking to aggressiveness of the user and with the accident risk level (or collision risk level). For example, in a certain case, the user (e.g. a policy holder) may not care of a possible collision with another automotive vehicle and consequently, does not slow down to negotiate an intersection with the other automotive vehicle and labelled as highly risky even if the case does not involve any hard acceleration or breaking. This means that critical events can occur without any hard acceleration or breaking. A second conventional approach is based on identification of a risk score by use of the conventional sensor set-up (e.g. the global navigation satellite system (GNSS) receiver and the camera). The risk score is assigned to each identified maneuver of the user based on a statistical correlation with the accident risk level. For instance, a user who changes lane frequently is more likely to be involved in a car accident or a crash and thus, a high risk score is assigned to such maneuvers of the user. The different maneuvers of the user are identified based on a lane-change, U-turn or overtake due to which the user does not focus on intersection and negotiation with the other automotive vehicle and consequently, results into the car accident or the crash. However, the assigned risk score in this manner may be insufficient to accurately estimate the accident risk level of the automotive vehicle of the user. Thus, there exists a technical problem of inefficient and inaccurate estimation of the accident risk level of the automotive vehicle (i.e. the road traffic participant) of the user.

Therefore, in light of the foregoing discussion, the inventors have recognized that there exists a need to overcome the aforementioned drawbacks associated with the conventional approaches of estimating the accident risk level of the automotive vehicle of the user.

SUMMARY

Aspects of the present disclosure provide a method of estimating an accident risk level of a road traffic participant. The present disclosure provides a solution to the existing problem of inefficient and inaccurate estimation of the accident risk level of the road traffic participant. An aim of the present disclosure is to provide a solution that overcomes at least partially the problems encountered in the prior art and provides an improved method and system of accurately estimating an accident risk level of a road traffic participant.

In one aspect, the present disclosure provides a method of estimating an accident risk level of a road traffic participant. The road traffic participant is a first participant among a plurality of road traffic participants. The plurality of road traffic participants includes the first participant and one or more other participants. The method comprises generating a plurality of virtual trajectories of the first participant based on the following: a recorded initial position of the first participant, a recorded final position of the first participant, and a recorded initial position of each of the one or more other participants, each of the virtual trajectories of the first participant running from the recorded initial position of the first participant to the recorded final position of the first participant, the plurality of virtual trajectories of the first participant are associated one-to-one with a plurality of virtual behaviors of the first participant. The method further comprises identifying among the plurality of virtual trajectories of the first participant, a virtual trajectory that is most similar to a recorded trajectory of the first participant, the recorded trajectory of the first participant running from the recorded initial position to the recorded final position of the first participant. The method further comprises estimating the accident risk level based on the virtual behavior associated with the identified virtual trajectory.

The method of the present disclosure provides an automatic interpretation about the first participant's maneuvers from a point of view of interaction with the one or more other road traffic participants. Such interpretation is beneficial for an automotive insurance because a large number of collisions happen due to less interaction with the one or more other road traffic participants. The disclosed method uses the plurality of virtual trajectories which are associated with the plurality of virtual behaviors of the first participant to interpret an actual trajectory (i.e. the recorded trajectory) performed by the first participant and thus, estimates the accident risk level of the first participant with more accuracy. The disclosed method identifies the new maneuvers of the first participant and accordingly, updates the accident risk level of the first participant. The disclosed method infers the accident risk level of the first participant (e.g. an ego vehicle) based on interactions and negotiations with the one or more other road traffic participants.

In an implementation form, the method of generating the plurality of virtual trajectories of the first participant comprises generating for each of the plurality of virtual behaviors of the first participant a respective virtual trajectory of the first participant based on the respective virtual behavior of the first participant.

By virtue of generating the respective virtual trajectory based on the respective virtual behavior of the first participant, a more accurate accident risk level of the first participant is estimated.

In a further implementation form, the method of generating the plurality of virtual trajectories of the first participant comprises generating for each of the plurality of virtual behaviors of the first participant a respective virtual trajectory of the first participant based further on the recorded initial position of each of the one or more other participants.

By virtue of generating the respective virtual trajectory of the first participant based on the recorded initial position of each of the one or more other participants, the accident risk level is estimated more precisely to detect how the first participant interact or negotiate with the one or more other participants.

In a further implementation form, the method of generating the plurality of virtual trajectories of the first participant comprises generating for each of the one or more other participants a virtual final position. The method further comprises generating a first virtual trajectory of the first participant based on a first virtual behavior from the plurality of behaviors of the first participant, the first virtual trajectory of the first participant being a first one of the plurality of virtual trajectories of the first participant. The method further comprises generating for each of the one or more other participants a virtual trajectory of the respective other participant based on a virtual behavior of the respective other participant, the virtual trajectory of the respective other participant running from the recorded initial position of the respective participant to the virtual final position of the respective participant. The method further comprises identifying one or more proximity zones based on the first virtual trajectory of the first participant and based on the virtual trajectory of each of the one or more other participants, each proximity zone being a spatio-temporal region in which the first participant is in a proximity with at least one of the other one or more participants, and for each of the one or more proximity zones and for each of one or more further virtual behaviors from the plurality of virtual behaviors of the first participant, the method further comprises generating a further one of the virtual trajectories of the first participant based on the respective proximity zone and based on the respective further virtual behavior.

The method of estimating the accident risk level focus on interactions and negotiations (e.g. give the way or take the way) of the first participant with each of the one or more other participants to avoid a collision. The proximity zones of the first participant with the one or more other participants are identified based on the plurality of virtual trajectories of the first participant. Based on the identified proximity zones, the plurality of virtual trajectories of the first participant and the one or more other participants are updated to avoid the collision.

In a further implementation form, the method of generating for each of the one or more other participants a virtual final position comprises generating the respective virtual final position based on a recorded initial position of the respective other participant.

By virtue of generating the respective virtual final position based on the recorded initial position of the respective other participant, it is feasible to compute the plurality of virtual trajectories of the first participant to avoid an accident.

In a further implementation form, the method of generating the respective virtual final position is based further on a map of an area that includes the recorded initial position of the first participant and the recorded initial position of each of the other participants.

By use of the map of the area that includes the recorded initial position of the first participant and the recorded initial position of each of the other participants, the plurality of virtual trajectories of the respective participant are generated with more precision. Additionally, the virtual behavior of the first participant can be easily checked to comply with the traffic rules those are stored on the map of the area.

In a further implementation form, the method of generating the respective virtual final position is based further on traffic rule information, which is information about traffic rules applicable in the area.

By using the traffic rule information for generating the respective virtual final position, the overall accident risk level is estimated with more accuracy.

In a further implementation form, the method of estimating the accident risk level is further based on the traffic rule information.

Based on checking whether the virtual behavior of the first participant complies with the traffic rules or not, the accident risk level is estimated with more accuracy. For example, in certain situations the virtual behavior (e.g. take the way) of the first participant is not compatible with a yield sign of the traffic rule, which in turn may cause a bigger accident risk level.

It is to be appreciated that all the aforementioned implementation forms can be combined.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, and features of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
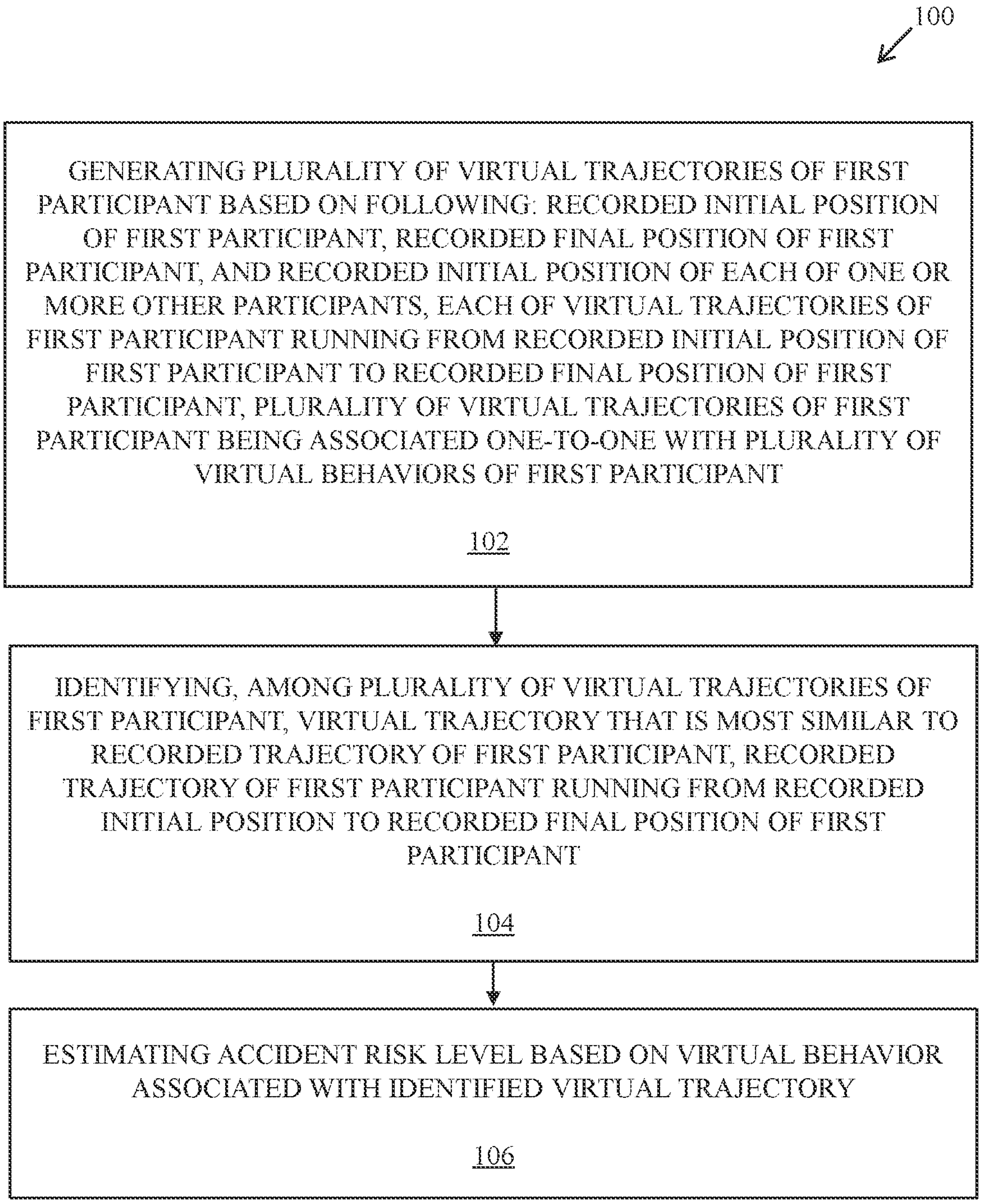
FIG. 1 is a flowchart of a method of estimating an accident risk level of a road traffic participant, in accordance with an embodiment of the present disclosure.

FIG. 1 is a flowchart of a method of estimating an accident risk level of a road traffic participant, in accordance with an embodiment of the present disclosure. With reference to FIG. 1, there is shown a method 100 of estimating an accident risk level of a road traffic participant. The method 100 includes steps from 102 to 106. In an implementation, the method 100 is executed in the road traffic participant described in details, for example, in FIGS. 11A-11C.

The method 100 estimates the accident risk level of the road traffic participant. The road traffic participant is a first participant among a plurality of road traffic participants. The plurality of road traffic participants includes the first participant and one or more other participants. The method 100 estimates the accident risk level of the first participant with the one or more other road traffic participants. The accident risk level may also be referred as a collision risk level of the first participant with the one or more other road traffic participants. For example, the first participant may be an autonomous vehicle. Alternatively, the first participant may be a non-autonomous vehicle (e.g. a human-driven vehicle), or a semi-autonomous vehicle. Similarly, the one or more other road traffic participants correspond to either non-autonomous vehicles, or autonomous vehicles or semi-autonomous vehicles or pedestrian and the like.

At step 102, the method 100 comprises generating a plurality of virtual trajectories of the first participant based on the following: a recorded initial position of the first participant, a recorded final position of the first participant, and a recorded initial position of each of the one or more other participants, each of the virtual trajectories of the first participant running from the recorded initial position of the first participant to the recorded final position of the first participant, the plurality of virtual trajectories of the first participant are associated one-to-one with a plurality of virtual behaviors of the first participant. The method 100 estimates the accident risk level of the first participant based on a trajectory generation algorithm which is used for generating the plurality of virtual trajectories of the first participant. The plurality of virtual trajectories of the first participant is generated based on the recorded initial position and the recorded final position of the first participant as well as on the recorded initial position of the one or more other participants. In an implementation, the recorded initial position of the first participant may also be referred to as a starting location and the recorded final position of the first participant may also be referred to as a destination location. The plurality of virtual trajectories of the first participant are associated one-to-one with the plurality of virtual behaviors of the first participant. The plurality of virtual behaviors of the first participant corresponds to different maneuvers which can be performed by the first participant from the recorded initial position to the recorded final position, while having interactions or negotiations with the one or more other road traffic participants. The different exemplary scenario of estimating the accident risk level of the first participant with the one or more other road traffic participants are described in details, for example, in FIGS. 6A, 7A, 8A, 8C, and 9A.

At step 104, the method 100 further comprises identifying, among the plurality of virtual trajectories of the first participant, a virtual trajectory that is most similar to a recorded trajectory of the first participant, the recorded trajectory of the first participant running from the recorded initial position to the recorded final position of the first participant. The identification of the virtual trajectory among the plurality of virtual trajectories which is most similar to the recorded trajectory of the first participant results into an automatic interpretation of a maneuver (or maneuvers) of the first participant. In an implementation, the recorded trajectory of the first participant can be characterized in terms of sequences of speed and spatial positions over time. In such implementation, a distance-based similarity metric can be used to identify the most similar virtual trajectory among the plurality of virtual trajectories with the recorded trajectory of the first participant. Such an implementation scenario is described in detail, for example in FIG. 9A.

At step 106, the method 100 further comprises estimating the accident risk level based on the virtual behavior associated with the identified virtual trajectory. The accident risk level (or collision risk level) is estimated based on the continuous collection of the maneuver (or maneuvers) performed by the first participant which further lead to build a plurality of collision risk features. The plurality of collision risk features includes the number of accidents (or collisions) taken care by the first participant which means that the number of accidents for which an action has been performed by the first participant such as either take the way (TW) or give the way (GW) to the other one or more road traffic participants. The plurality of collision risk features also includes ratio of take the way to give the way (TW/GW) performed by the first participant as well as based on TR index that is number of traffic rules broken in every 100 km of driving by the first participant.

In accordance with an embodiment, the method of generating the plurality of virtual trajectories of the first participant comprises generating for each of the plurality of virtual behaviors of the first participant a respective virtual trajectory of the first participant based on the respective virtual behavior of the first participant. For example, at an intersection point, the first participant may have different virtual behaviors, such as the first participant may either give the way to another traffic participant or take the way from the other traffic participant or does not interact with the other traffic participant, while moving through the intersection point. Each virtual behavior of the first participant leads to the generation of the respective virtual trajectory. In this way, the plurality of virtual trajectories are generated based on the plurality of virtual behaviors (e.g. take the way or give the way or interaction-free virtual behaviors) of the first participant.

In accordance with an embodiment, the method of generating the plurality of virtual trajectories of the first participant comprises generating for each of the plurality of virtual behaviors of the first participant a respective virtual trajectory of the first participant based further on the recorded initial position of each of the one or more other participants. For example, the recorded initial position of each of the one or more other traffic participants includes an intersection point. In such a case, the virtual behavior of the first participant includes given the way to the one or more other traffic participants at the intersection point, or taken the way from the one or more other traffic participants at the intersection point or interaction-free trajectory at the intersection point. Based on different types of the virtual behaviour of the first participant and the recorded initial position of each of the one or more other participants, the respective virtual trajectory of the first participant is generated.

In accordance with an embodiment, the method of generating the plurality of virtual trajectories of the first participant comprises generating for each of the one or more other participants a virtual final position. The virtual final position of the one or more other traffic participants also affects the virtual behavior of the first participant and accordingly the virtual trajectory of the first participant.

In accordance with an embodiment, the method of generating a first virtual trajectory of the first participant based on a first virtual behavior from the plurality of behaviors of the first participant, the first virtual trajectory of the first participant being a first one of the plurality of virtual trajectories of the first participant. The first virtual behavior of any traffic participant is an interaction-free behavior. For example, at an intersection point, the first participant may have the first virtual behavior of keeping the speed same (or the interaction-free virtual behavior) while moving through the intersection point. Therefore, the first virtual trajectory is generated based on the first virtual behavior (i.e. keeping the speed same or the interaction-free virtual behavior) of the first participant.

In accordance with an embodiment, the method of generating for each of the one or more other participants a virtual trajectory of the respective other participant based on a virtual behavior of the respective other participant, the virtual trajectory of the respective other participant running from the recorded initial position of the respective participant to the virtual final position of the respective participant. The virtual trajectory for each of the one or more other participants is generated based on the virtual behavior of each of the one or more other participants. For example, at an intersection point, if the respective other traffic participant takes the way from the first participant, then the virtual trajectory of the respective other traffic participant is generated based on the virtual behavior of taken the way. The virtual trajectory of the respective other traffic participant starts from the recorded initial position of the respective participant and terminates at the virtual final position of the respective participant.

In accordance with an embodiment, identifying one or more proximity zones based on the first virtual trajectory of the first participant and based on the virtual trajectory of each of the one or more other participants, each proximity zone being a spatio-temporal region in which the first participant is in a proximity with at least one of the other one or more participants. The spatio-temporal region is related to spatial positions of the first participant and the one or more other participants with respect to time. The one or more proximity zones may also be referred as the one or more virtual proximity zones as it is identified (or calculated) using at least two virtual trajectories. Therefore, the spatial positions of the first participant and the one or more other participants may also be referred as the virtual spatial positions of the first participant and the one or more other participants with respect to time. This means that at a particular time instant on the first virtual trajectory, the first participant is how much at a virtual spatial distance from the one or more other participants. The first virtual trajectory of the first participant and the virtual trajectory of each of the one or more other participants is used to identify the virtual spatial position of the first participant that lies near to at least one of the other one or more participants with respect to time.

In accordance with an embodiment, for each of the one or more proximity zones and for each of one or more further virtual behaviors from the plurality of virtual behaviors of the first participant, generating a further one of the virtual trajectories of the first participant based on the respective proximity zone and based on the respective further virtual behavior. For example, at an intersection point, if the first participant is identified at the virtual spatial position which is near to the one or more other traffic participants then, the first participant may exhibit the further virtual behaviors, such as the first participant either give the way to the one or more other traffic participants or take the way from the one or more other traffic participants to avoid a virtual collision at the intersection point. Based on the respective further virtual behaviors (i.e. give the way or take the way) of the first participant and the identified virtual spatial position, the further virtual trajectory of the first participant is generated.

In accordance with an embodiment, the method of generating for each of the one or more other participants a virtual final position comprises generating the respective virtual final position based on a recorded initial position of the respective other participant. The generation of the respective virtual final position of the respective other participant based on the recorded initial position of the respective other participant leads to the generation of the virtual final position of the one or more other participants.

In accordance with an embodiment, generating the respective virtual final position is based further on a map of an area that includes the recorded initial position of the first participant and the recorded initial position of each of the other participants. The respective virtual final position of the respective other participant is generated based on the high definition (HD) map of the driven area. The reason is that the HD map of the driven area includes the recorded initial positions of the first participant and each of the one or more other participants.

In accordance with an embodiment, generating the respective virtual final position is based further on traffic rule information, which is information about traffic rules applicable in the area. In an implementation, the HD map includes traffic rules (e.g., stop sign, give the way rule, and the like) which are applicable in the driven area and are used for generating the respective virtual final position of the respective other participant.

In accordance with an embodiment, estimating the accident risk level is further based on the traffic rule information. In an implementation, the HD map of the driven area includes traffic rules (e.g., stop sign, give the way rule, and the like), which is used for interpreting the maneuver (or maneuvers) of the first participant and the one or more other participants and hence, estimating the accident risk level of the first participant.

The steps 102, 104, and 106 are only illustrative and other alternatives can also be provided where one or more steps are added, one or more steps are removed, or one or more steps are provided in a different sequence without departing from the scope of the claims herein.

Figure 2:
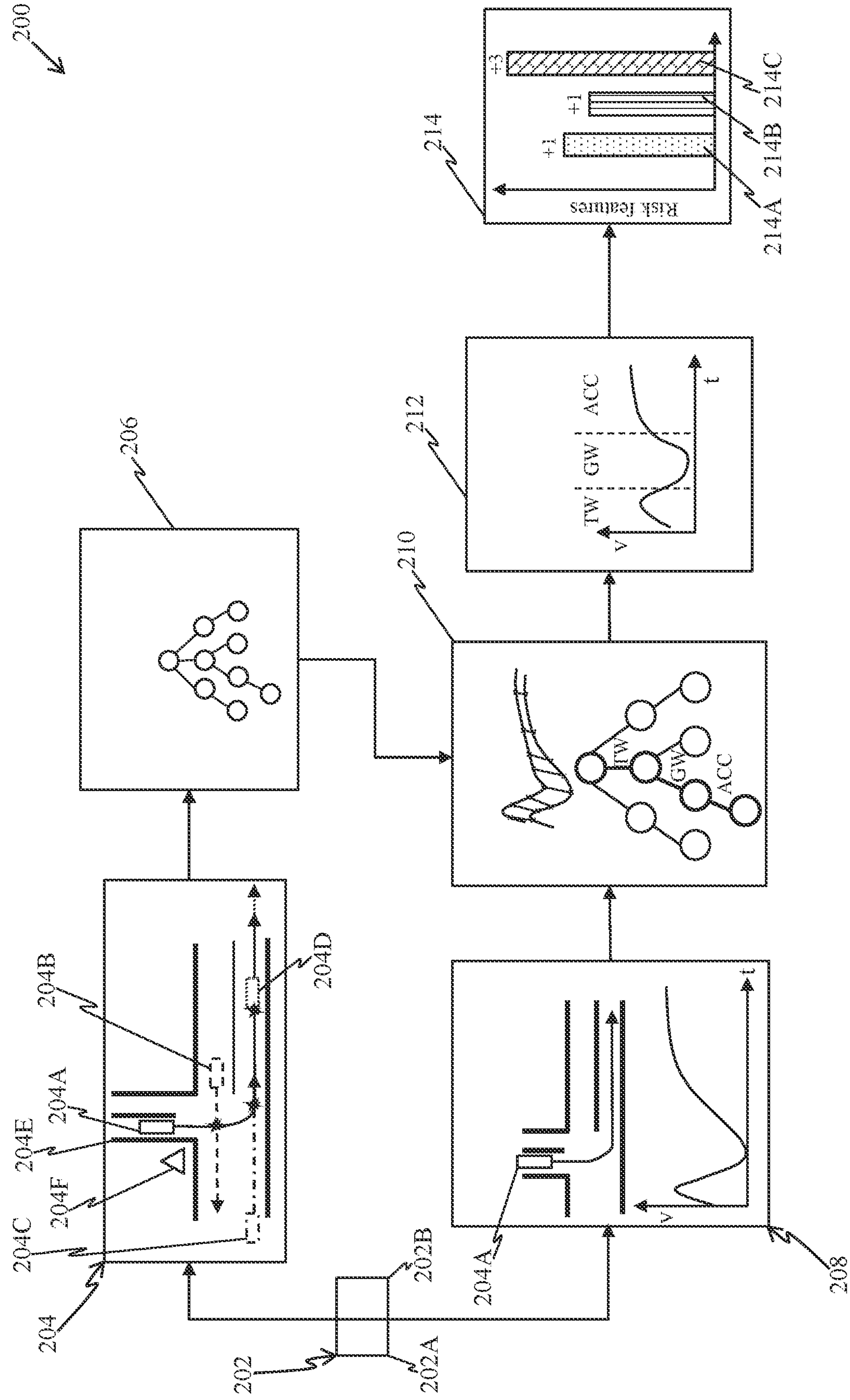
FIG. 2 is a working pipeline that depicts various operations of the method of estimating the accident risk level of the road traffic participant, in accordance with an embodiment of the present disclosure.

FIG. 2 is a working pipeline that depicts various operations of the method of estimating the accident risk level of the road traffic participant, in accordance with an embodiment of the present disclosure. FIG. 2 is described in conjunction with elements from FIG. 1. With reference to FIG. 2, there is shown a working pipeline 200 that depicts various operations of the method 100 (of FIG. 1) for estimating the accident risk level of the road traffic participant. In the working pipeline 200, there is shown a plurality of sensors 202, a driving scene 204, a collision driven trajectory generator 206, a recorded trajectory 208, trajectory matching 210, a trajectory interpretation 212, and an accident risk level representation 214. The plurality of sensors 202 includes a camera 202A, and a global navigation satellite system (GNSS) receiver 202B. The driving scene 204 includes a plurality of road traffic participants, such as a first participant 204A and one or more other participants 204B-204D, a road structure 204E and a geo-localized landmark 204F. The accident risk level representation 214 includes a plurality of count of risk features, such as a count of broken traffic rules 214A, a count of taken the way (TW) 214B, and a count of considered collisions 214C which can be performed by either the first participant 204A or the one or more other participants 204B-204D.

The working pipeline 200 depicts various operations of the method 100 of estimating the accident risk level of the first participant 204A based on the interactions and negotiations of the first participant 204A with the one or more other participants 204B-204D.

The plurality of sensors 202 is installed on the first participant 204A (e.g. a vehicle) in order to detect and localize the one or more other participants 204B-204D on the road structure 204E (i.e. a road portion). For example, the camera 202A may be a large field of view (FOV) camera with a focal length of greater than 90 cm which is used to detect a large number of traffic participants on the road structure 204E. In an implementation, the camera 202A corresponds to a video camera which is mounted on a dashboard or windscreen of the first participant 204A and used to continuously record a view of the road structure 204E and the one or more other participants 204B-204D. In such implementation, the camera 202A may also be referred as a dash-cam. The GNSS receiver 202B is configured to localize and track the first participant 204A and the one or more other participants 204B-204D by use of a high-definition (HD) map. The HD map generated by the GNSS receiver 202B represents the road structure 204E, the geo-localized landmark 204F and a road connectivity. The geo-localized landmark 204F includes traffic lanes and traffic signs. The HD map is used to align the first participant 204A and the one or more other participants 204B-204D.

The driving scene 204 corresponds to a semantic driving scene, which can be explained with the help of words and sentences. The driving scene 204 is generated based on the information received from the plurality of sensors 202. Alternatively stated, the one or more other participants 204B-204D which are detected and localized by use of the camera 202A and the GNSS receiver 202B are represented in the driving scene 204 along with their speed information.

The driving scene 204 further includes the road structure 204E, the geo-localized landmark 204F along with the road connectivity which collectively regulate the motion of the first participant 204A and the one or more other participants 204B-204D. The one or more other participants 204B-204D may also be represented as a second participant 204B, a third participant 204C and a fourth participant 204D.

The trajectory generator 206 generates a plurality of virtual trajectories of the first participant 204A as well as of the one or more other participants 204B-204D. The plurality of virtual trajectories of the first participant 204A and the one or more other participants 204B-204D depends on a plurality of virtual behaviors of the first participant 204A and the one or more other participants 204B-204D. The trajectory generator 206 may have a tree-like structure with a parent node and a plurality of child nodes. The parent node stores a virtual behavior and a corresponding virtual trajectory of each road traffic participant in an interaction-free environment. This means none of the first participant 204A and the one or more other participants 204B-204D interact with each other and moves with a constant speed. For example, in a case, the first participant 204A does not interact or negotiate with the one or more other participants 204B-204D and moves the constant speed. Therefore, a virtual behavior of keep speed same (KS) and the corresponding virtual trajectory of the first participant 204A is stored in the parent node. The plurality of child nodes store the plurality of virtual behaviors (e.g. give the way or take the way) and the plurality of virtual trajectories based on the interaction or negotiation of the first participant 204A with the one or more other participants 204B-204D. Additionally, the trajectory generator 206 stores the an intention label with an identity for each of the plurality of virtual behaviors of the first participant 204A as well as for the one or more other participants 204B-204D. For example, for the first participant 204A, the virtual behavior of give the way (GW) to the one or more other participants 204B-204D is stored with the identity 1. The trajectory generator 206 is also referred as a trajectory generation algorithm. The trajectory generator 206 is further described in detail, for example, in Table 1.

The recorded trajectory 208 represents an actual trajectory followed by the first participant 204A. The actual trajectory of the first participant 204A is characterized in terms of sequences of speed and spatial positions over time. Alternatively stated, the actual trajectory of the first participant 204A relates to a spatio-temporal region.

The trajectory matching 210 represents an identification of a virtual trajectory from the plurality of virtual trajectories generated by trajectory generator 206 which is most similar to the recorded trajectory 208 of the first participant 204A based on a distance-based similarity metric.

The trajectory interpretation 212 includes an automatic interpretation of an actual maneuver (or behavior) of the first participant 204A based on a comparison between the matched virtual trajectory and the recorded trajectory 208 of the first participant 204A. The virtual behavior associated with the matched virtual trajectory is considered as the actual maneuver of the first participant 204A. Further, the actual maneuver of the first participant 204A is compared with the traffic rules stored on the HD map (e.g., stop sign, give the way rule, and the like) to detect if the actual maneuver of the first participant 204A complies with the traffic rules or not.

The accident risk level representation 214 includes estimation of a plurality of collision risk features based on the continuous collection of manuvers performed by the first participant 204A. The plurality of collision risk features include a number of accidents taken care by the first participant 204A, and a ratio of take the way (TW) to give the way (GW) of the first participant 204A. The number of accidents taken care by the first participant corresponds to the number of accidents for which an action (e.g. TW or GW) is performed by the first participant 204A. The ratio of a number of times the way is taken (TW) by the first participant 204A with respect to a number of times the way is given to the one or more other participants 204B-204D. The accident risk level representation 214 further includes the count of broken traffic rules 214A, the count of taken the way (TW) 214B, and the count of considered collisions 214C which are performed by the first participant 204A to interpret a more precise actual maneuver of the first participant 204A.

TABLE 1

| line no. | pseudo-code of the trajectory generation |
|---|---|
| 1. | Identify goals on HD Map |
| 2. | for all agents: |
| 3. | for all goals(agent) |
| 4. | new_traj = computeBaseTraj (Goal) # Constant speed |
| 5. | traj_tree ← initTree(new_traj) |
| 6. | collision_que ← computeCollisions(traj_tree) |
| 7. | while collision_que : |
| 8. | collision ← pop(new_collision_set) |
| 9. | for all agent in collision |
| 10. | new_traj ← resolveCollisions(collision) |
| 11. | expandTree(traj_tree,new_traj) |
| 12. | new_collision ← computeCollisions(traj_tree) |
| 13. | push new_collisions into collision_que |

The line 1 (instruction) refers to the identification of a plurality of goals in the surrounding of the first participant 204A as well as the one or more other participants 204B-204D. The plurality of goals correspond to center lane of roads those can be travelled in the surrounding of the first participant 204A, a plurality of recorded initial positions and a plurality of recorded final positions of the first participant 204A as well as a plurality of recorded initial positions and a plurality of virtual final positions of the one or more other participants 204B-204D.

The lines 2-*4 (instructions) refer to generation of an initial interaction-free virtual trajectory for the first participant 204A as well as for the one or more other participants 204B-204D. For example, if an intersection is considered, then the initial interaction-free virtual trajectory of the first participant 204A as well as of the one or more other participants 204B-204D would be to proceed at a constant speed through the intersection.

The line 5 (instruction) refers to initialization of the trajectory generator 206 of the road traffic participants 204A-204D with the parent (or root) node. The parent node stores a virtual behavior (i.e. keep speed same (KS)) of the first participant 204A as well as of the one or more other participants 204B-204D when moving through the intersection point.

The line 6 (instruction) refers to identification of a possible number of collisions (or accidents) between the first participant 204A and the one or more other participants 204B-204D based on the initial interaction-free virtual trajectory of the first participant 204A as well as of the one or more other participants 204B-204D at the intersection point.

The lines 7→11 (instructions) refer to computation of a plurality of new virtual trajectories for each participant based on the identified possible number of collisions (or accidents) between the first participant 204A and the one or more other participants 204B-204D. The plurality of new virtual trajectories for each participant is computed based on a plurality of new virtual behaviors (or intentions or negotiations or interactions) which are used to avoid the collision. For example, at the intersection point, the first participant 204A may either give the way (GW) or take the way (TW) to the one or more other participants 204B-204D to avoid the accident. After computation, the plurality of new virtual trajectories (i.e. give the way trajectory or take the way trajectory) and the plurality of new virtual behaviors (i.e. give the way or take the way) of the first participant 204A and the one or more other participants 204B-204D are stored in the plurality of child nodes of the parent node of the trajectory generator 206.

The lines 12→43 (instructions) refer to identification of another possible number of collisions among the plurality of new virtual trajectories of the first participant 204A and the one or more other participants 204B-204D. After identification of the other possible number of collisions, the lines 7→12 are iteratively repeated until the identified possible number of collisions are resolved.

After resolving all the identified possible number of collisions, a plurality of final virtual trajectories and a plurality of final virtual behaviors of the first participant 204A and the one or more other participants 204B-204D are stored in the trajectory generator 206. In this way, generation of the plurality of virtual trajectories is performed in a centralized iterative manner to avoid the collision. Additionally, the trajectory generator 206 is updated iteratively which stores the plurality of virtual trajectories and the plurality of virtual behaviors of the first participant 204A and the one or more other participants 204B-204D to avoid the collision.

Figure 3:
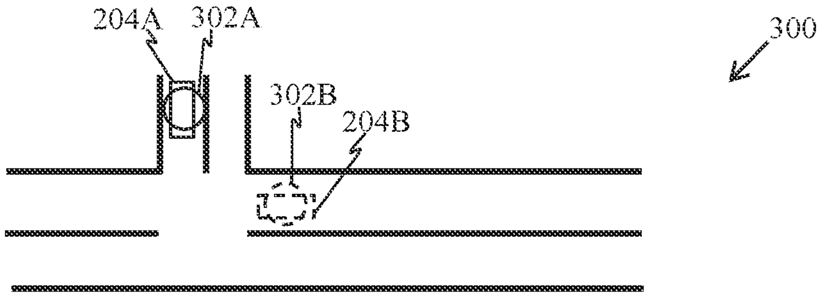
FIG. 3 is an exemplary implementation of a driving scene that depicts recorded initial positions of road traffic participants, in accordance with an embodiment of the present disclosure.

FIG. 3 is an exemplary implementation of a driving scene that depicts recorded initial positions of road traffic participants, in accordance with an embodiment of the present disclosure. FIG. 3 is described in conjunction with elements from FIGS. 1 and 2. With reference to FIG. 3 there is shown an exemplary implementation of a driving scene 300 that represents a first recorded initial position 302A of the first participant 204A and a second recorded initial position 302B of the second participant 204B on the road structure 204E. Alternatively stated, the first recorded initial position 302A of the first participant 204A is referred as a starting location of the first participant 204A. Similarly, the second recorded initial position 302B of the second participant 204B is referred as a starting location of the second participant 204B. The first recorded initial position 302A of the first participant 204A and the second recorded initial position 302B of the second participant 204B is used to generate a virtual trajectory (or a plurality of virtual trajectories) of the first participant 204A.

Figure 4:
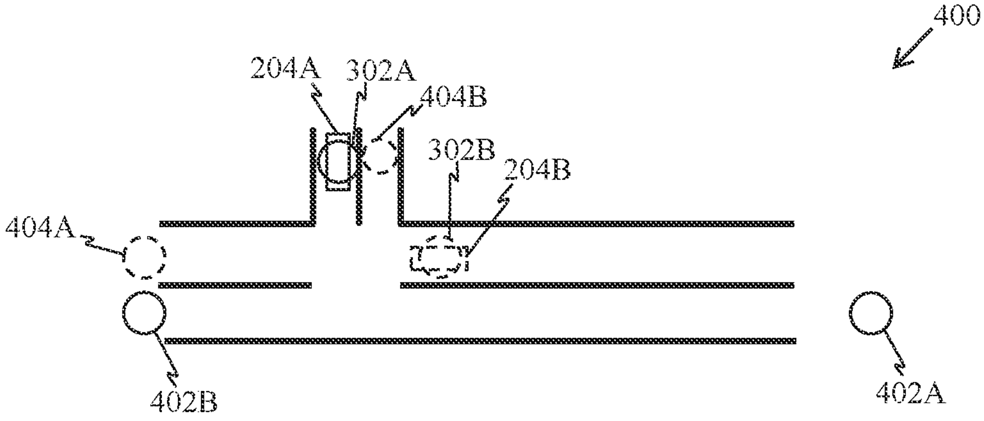
FIG. 4 is an exemplary implementation of a driving scene that depicts final positions of road traffic participants, in accordance with an embodiment of the present disclosure.

FIG. 4 is an exemplary implementation of a driving scene that depicts final positions of road traffic participants, in accordance with an embodiment of the present disclosure. FIG. 4 is described in conjunction with elements from FIGS. 1, 2, and 3. With reference to FIG. 4, there is shown an exemplary implementation of a driving scene 400 that represents recorded final positions 402A and 402B of the first participant 204A and virtual final positions 404A and 404B of the second participant 204B. In an example, the virtual final positions 404A and 404B of the second participant 204B refer to possible hypothetical future positions or possible future destinations, and the like.

Figure 5A:
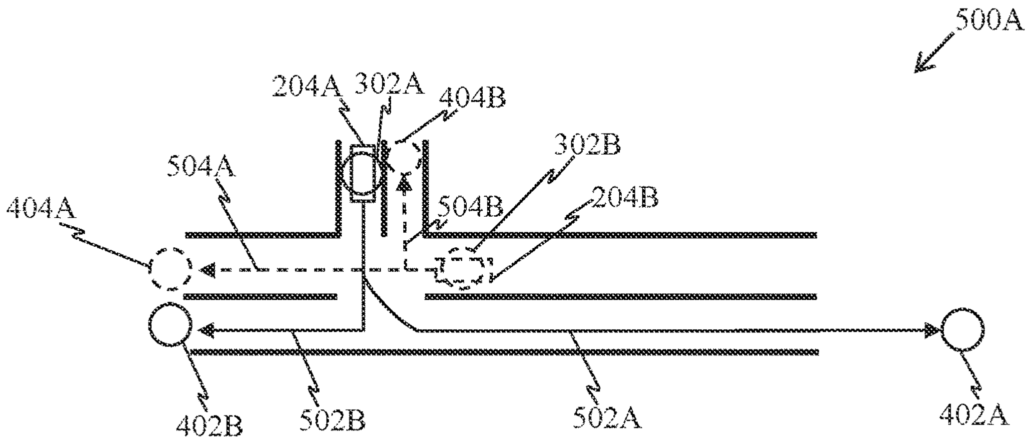
FIG. 5A is an exemplary implementation of a driving scene that depicts a plurality of virtual trajectories of road traffic participants, in accordance with an embodiment of the present disclosure.

FIG. 5A is an exemplary implementation of a driving scene that depicts a plurality of virtual trajectories of road traffic participants, in accordance with an embodiment of the present disclosure. FIG. 5A is described in conjunction with elements from FIGS. 1, 2, 3, and FIG. 4. With reference to FIG. 5A there is shown an exemplary implementation of a driving scene 500A that represents a first plurality of virtual trajectories 502A and 502B of the first participant 204A, and a second plurality of virtual trajectories 504A and 504B of the second participant 204B. The first plurality of virtual trajectories 502A and 502B are generated based on the first recorded initial position 302A of the first participant 204A, the recorded final positions 402A and 402B of the first participant 204A and the second recorded initial position 302B of the second participant 204B. Similarly, the second plurality of virtual trajectories 504A and 504B are generated based on the second recorded initial position 302B of the second participant 204B, the virtual final positions 404A and 404B of the second participant 204B and the first recorded initial position 302A of the first participant 204A. The first plurality of virtual trajectories 502A and 502B and the second plurality of virtual trajectories 504A and 504B depend upon a plurality of virtual behaviors of the first participant 204A and the second participant 204B, respectively.

Figure 5B:
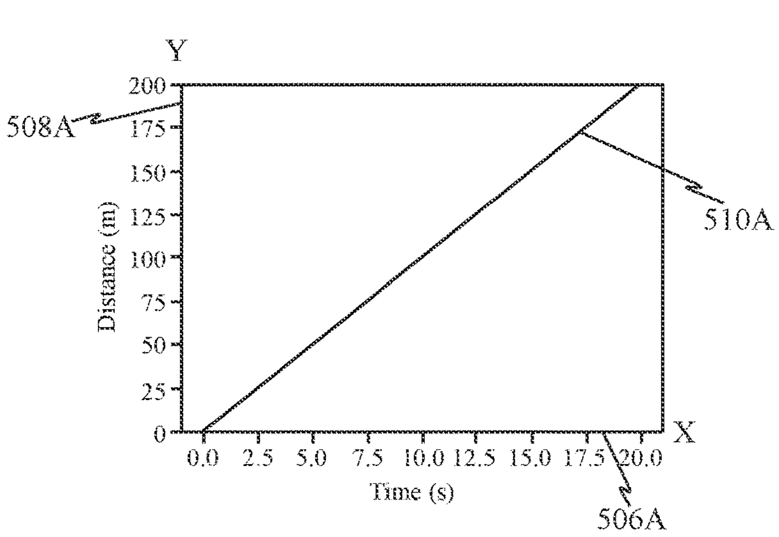
FIG. 5B is a graphical representation that illustrates an interaction-free motion planning of the first participant in spatio-temporal region, in accordance with an embodiment of the present disclosure.

FIG. 5B is a graphical representation that illustrates an interaction-free motion planning of the first participant in spatio-temporal region, in accordance with an embodiment of the present disclosure. FIG. 5B is described in conjunction with elements from FIGS. 1, 2, 3, 4, and 5A. With reference to FIG. 5B, there is shown a graphical representation 500B that illustrates an interaction-free motion planning of the first participant 204A (of FIG. 2) in a spatio-temporal region. The graphical representation 500B includes an X-axis 506A that represents values of time in seconds (s) and a Y-axis 508A that represents values of distance in meter (m).

In the graphical representation 500B, a first line line 510A represents an interaction-free motion planning of the first participant 204A in the spatio-temporal region. The spatio-temporal region is related to various spatial positions of the first participant 204A at different time instants. The interaction-free motion planning of the first participant 204A means that the first participant 204A does not interact or negotiate with the one or more other traffic participants, such as the second participant 204B. The interaction-free motion planning of the first participant 204A corresponds to a virtual trajectory which is based on a virtual behavior due to which the first participant 204A does not interact or negotiate with the one or more other traffic participants, such as the second participant 204B.

Figure 5C:
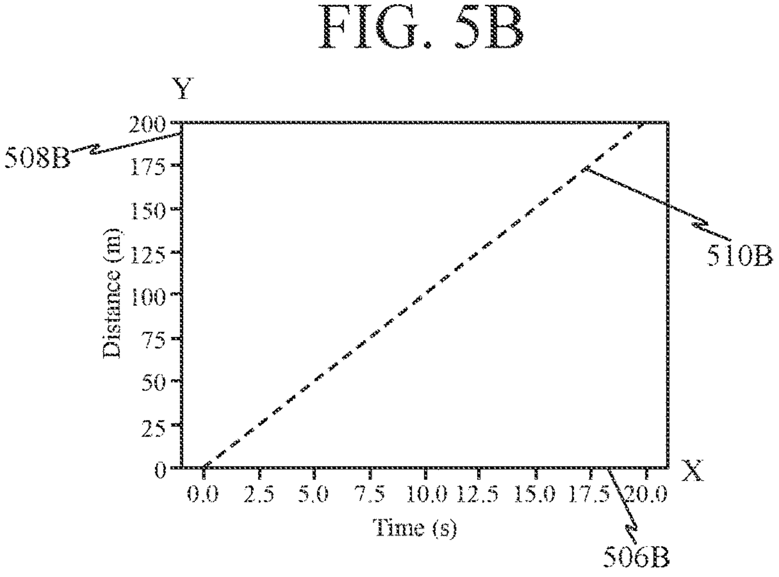
FIG. 5C is a graphical representation that illustrates an interaction-free motion planning of the second participant in spatio-temporal region, in accordance with an embodiment of the present disclosure.

FIG. 5C is a graphical representation that illustrates an interaction-free motion planning of the second participant in spatio-temporal region, in accordance with an embodiment of the present disclosure. FIG. 5C is described in conjunction with elements from FIGS. 1, 2, 3, 4, 5A, and 5B. With reference to FIG. 5C, there is shown a graphical representation 500C that illustrates an interaction-free motion planning of the second participant 204B (of FIG. 2) in a spatio-temporal region. The graphical representation 500C includes an X-axis 506B that represents values of time in seconds (s) and a Y-axis 508B that represents values of distance in meter (m).

In the graphical representation 500C, a first line line 510B represents an interaction-free motion planning of the second participant 204B in the spatio-temporal region. The spatio-temporal region is related to various spatial positions of the second participant 204B at different time instants. The interaction-free motion planning of the second participant 204B means that second participant 204B does not interact or negotiate with the first participant 204A. The interaction-free motion planning of the second participant 204B corresponds to a virtual trajectory which is based on a virtual behavior due to which the second participant 204B does not interact or negotiate with the first participant 204A.

Figure 5D:
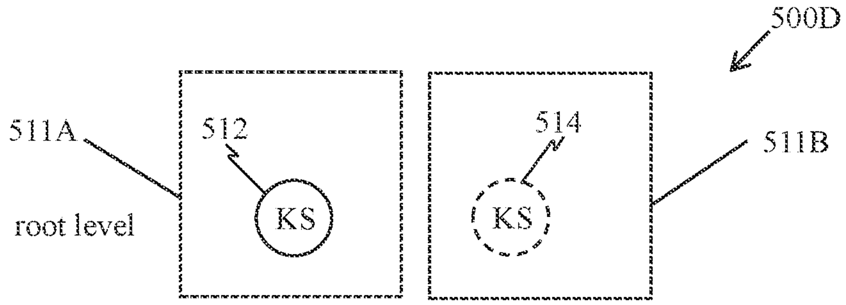
FIG. 5D is a scenario that depicts trajectory generators of the road traffic participants, in accordance with an embodiment of the present disclosure.

FIG. 5D is a scenario that depicts trajectory generators of the road traffic participants, in accordance with an embodiment of the present disclosure. FIG. 5D is described in conjunction with elements from FIGS. 1, 2, 3, 4, 5A, 5B, and 5C. With reference to FIG. 5D there is shown a scenario 500D that includes a first trajectory generator 511A of the first participant 204A and a second trajectory generator 511B of the second participant 204B. There is further shown a first parent node 512 of the first trajectory generator 511A and another first parent node 514 of the second trajectory generator 511B.

The first parent node 512 of the first trajectory generator 511A is related to the first participant 204A and stores a plurality of virtual behaviors, the first plurality of virtual trajectories 502A and 502B, a speed profile and a spatial path of the first participant 204A. Similarly, the other first parent node 514 of the second trajectory generator 511B is related to the second participant 204B and stores a plurality of virtual behaviors, the second plurality of virtual trajectories 504A and 504B, a speed profile and a spatial path of the second participant 204B. For example, at an intersection point, the first participant 204A and the second participant 204B do not negotiate or interact with each other and move on with the same speed. In such a case, the first parent node 512 stores a virtual behavior of keep speed same (KS) of the first participant 204A at a root level. Similarly, the other first parent node 514 stores a virtual behavior of keep speed same (KS) of the second participant 204B at the root level. The first trajectory generator 511A and the second trajectory generator 511B correspond to a tree-like structure with the first parent node 512 and the other first parent node 514, respectively.

Figure 6A:
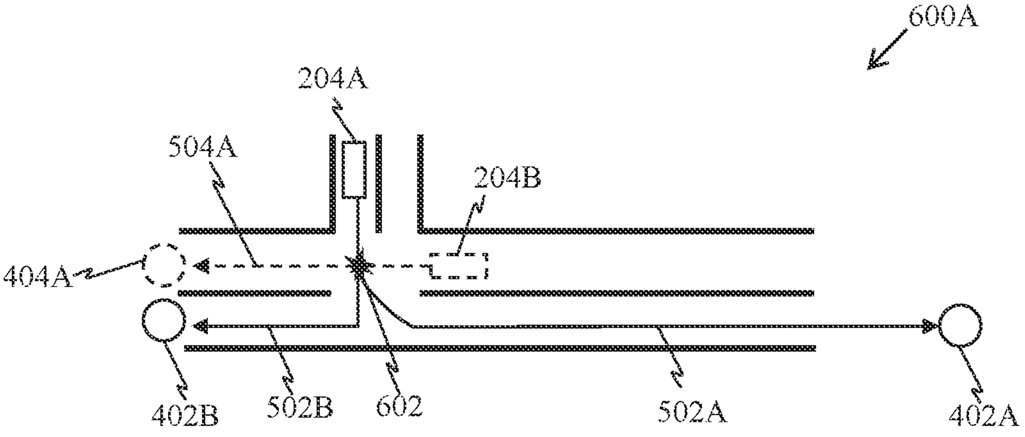
FIG. 6A is an exemplary implementation of a driving scene that depicts a collision of road traffic participants, in accordance with an embodiment of the present disclosure.

FIG. 6A is an exemplary implementation of a driving scene that depicts a collision of road traffic participants, in accordance with an embodiment of the present disclosure. FIG. 6A is described in conjunction with elements from FIGS. 1, 2, 3, 4, and 5A. With reference to FIG. 6A, there is shown an exemplary implementation of a driving scene 600A that depicts a collision 602 of the first participant 204A and the second participant 204B at a T-intersection point.

In the driving scene 600A, the first participant 204A follows a first trajectory 502A of the first plurality of virtual trajectories 502A and 502B (of FIG. 5A). Similarly, the second participant 204B follows a first virtual trajectory 504A of the second plurality of virtual trajectories 504A and 504B (of FIG. 5A). The first participant 204A and the second participant 204B do not interact or negotiate with each other and follow their respective virtual trajectories with the same speed which results into the collision 602 at the T-intersection point. In another case, the first participant 204A follows a second trajectory 502B of the first plurality of virtual trajectories 502A and 502B (of FIG. 5A). The second participant 204B follows a first virtual trajectory 504A of the second plurality of virtual trajectories 504A and 504B (of FIG. 5A). The first participant 204A and the second participant 204B do not interact or negotiate with each other and follow their respective virtual trajectories with the same speed which also results into the collision 602 at the T-intersection point.

Figure 6B:
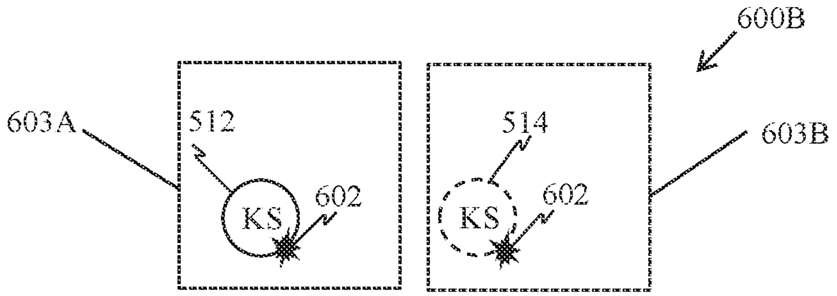
FIG. 6B is a scenario that depicts trajectory generators of the road traffic participants, in accordance with an embodiment of the present disclosure.

FIG. 6B is a scenario that depicts trajectory generators of the road traffic participants, in accordance with another embodiment of the present disclosure. FIG. 6B is described in conjunction with elements from FIGS. 1, 2, 3, 4, 5A, 5D, and 6A. With reference to FIG. 6B there is shown a scenario 600B that includes a first trajectory generator 603A of the first participant 204A and a second trajectory generator 603B of the second participant 204B. There is further shown the collision 602 which is associated with the first parent node 512 and the other first parent node 514.

The collision 602 is stored at the first parent node 512 of the first participant 204A and also, at the other first parent node 514 of the second participant 204B. The collision 602 happen because of a virtual behavior (i.e. keep speed same (KS)) of the first participant 204A and the second participant 204B at the T-intersection point. The first participant 204A and the second participant 204B may avoid the collision 602 by interacting or negotiating with each other, which is described in detail, for example, in FIGS. 7A-7G.

Figure 7A:
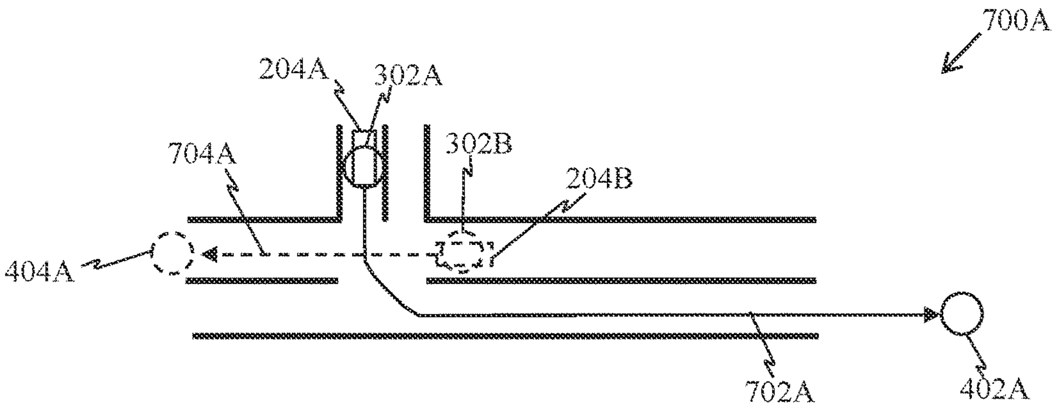
FIG. 7A is an exemplary implementation of a driving scene that depicts a plurality of virtual trajectories of road traffic participants in order to avoid the collision, in accordance with an embodiment of the present disclosure.

FIG. 7A is an exemplary implementation of a driving scene that depicts a plurality of virtual trajectories of road traffic participants in order to avoid the collision, in accordance with an embodiment of the present disclosure. FIG. 7A is described in conjunction with elements from FIGS. 1, 2, 3, 4, 5A, and 6A. With reference to FIG. 7A there is shown an exemplary implementation of a driving scene 700A that represents a first virtual trajectory 702A of the first participant 204A and a second virtual trajectory 704A of the second participant 204B.

The first virtual trajectory 702A of the first participant 204A and the second virtual trajectory 704A of the second participant 204B are computed based on a plurality of virtual behaviors of the first participant 204A and the second participant 204B which are followed to avoid the collision 602. In an example, at the T-intersection point (of FIG. 6A), the first participant 204A gives the way (GW) to the second participant 204B and follows the first virtual trajectory 702A. Consequently, the second participant 204B takes the way (TW) form the first participant 204A and follows the second virtual trajectory 704A. In this way, the collision 602 is avoided based on the virtual behavior of the GW of the first participant 204A and the TW of the second participant 204B. A trajectory generator based on the virtual behaviors of GW of the first participant 204A and TW of the second participant 204B is described in detail, for example, in FIG. 7B. In another example, at the T-intersection point (of FIG. 6A), the first participant 204A takes the way (TW) from the second participant 204B and follows the first virtual trajectory 702A. Consequently, the second participant 204B gives the way (GW) to the first participant 204A and follows the second virtual trajectory 704A. In this way, the collision 602 is avoided based on the virtual behavior of the TW of the first participant 204A and the GW of the second participant 204B. A trajectory generator based on the virtual behaviors of TW of the first participant 204A and GW of the second participant 204B is described in detail, for example, in FIG. 7C. In this way, the collision 602 is avoided based on the plurality of virtual behaviors (i.e. the GW or the TW) of the first participant 204A and the second participant 204B.

Figure 7B:
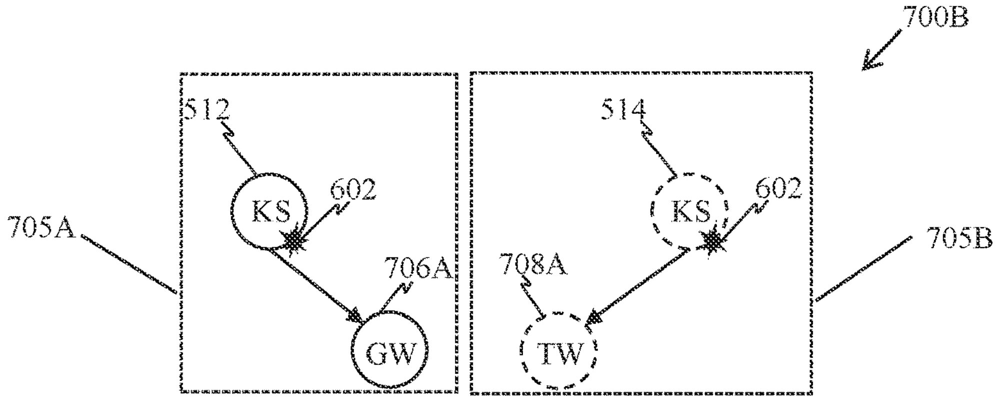
FIG. 7B is a scenario that depicts trajectory generators that avoids the collision of the road traffic participants, in accordance with an embodiment of the present disclosure.

FIG. 7B is a scenario that depicts trajectory generators that avoids the collision of the road traffic participants, in accordance with an embodiment of the present disclosure. FIG. 7B is described in conjunction with elements from FIGS. 1, 2, 3, 4, 5D, 6A, 6B and 7A. With reference to FIG. 7B there is shown a scenario 700B that includes a first trajectory generator 705A and a second trajectory generator 705B. The first trajectory generator 705A and the second trajectory generator 705B avoid the collision 602 of the first participant 204A and the second participant 204B. There is further shown a first child node 706A of the first parent node 512 of the first trajectory generator 705A and a first child node 708A of the other first parent node 514 of the second trajectory generator 705B.

The first child node 706A is based on the virtual behavior (i.e. give the way (GW)) which is used by the first participant 204A to avoid the collision 602. Therefore, the first child node 706A of the first parent node 512 stores the virtual behavior of GW as well as the first virtual trajectory 702A of the first participant 204A. Similarly, the first child node 708A of the other first parent node 514 is based on the virtual behavior (i.e. take the way (TW)) which is used by the second participant 204B to avoid the collision 602. Therefore, the first child node 708A of the other first parent node 514 stores the virtual behavior of TW as well as the second virtual trajectory 704A of the second participant 204B.

Figure 7C:
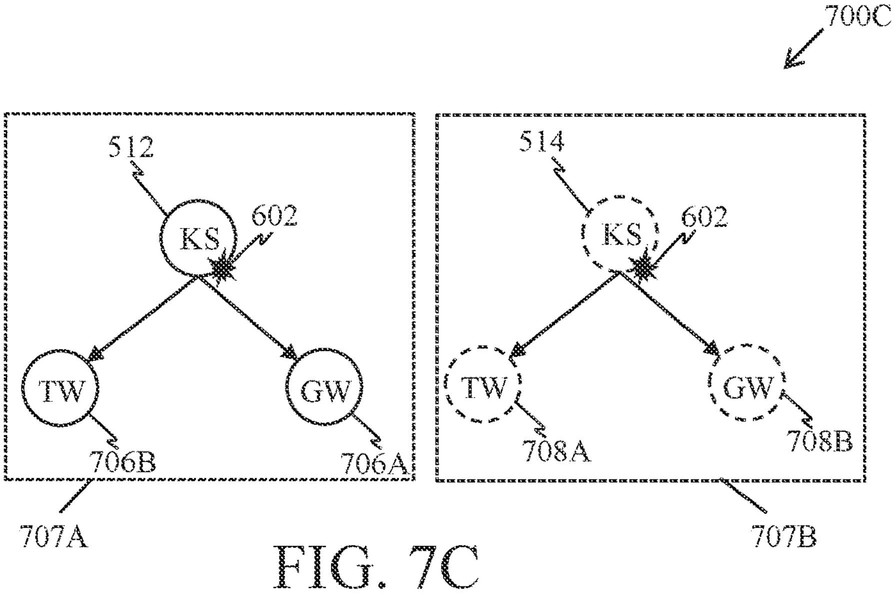
FIG. 7C is a scenario that depicts trajectory generators that avoids the collision of the road traffic participants, in accordance with an embodiment of the present disclosure.

FIG. 7C is a scenario that depicts trajectory generators that avoids the collision of the road traffic participants, in accordance with another embodiment of the present disclosure. FIG. 7C is described in conjunction with elements from FIGS. 1, 2, 3, 4, 5D, 6A, 6B, 7A, and 7B. With reference to FIG. 7C there is shown a scenario 700C that includes a first trajectory generator 707A and a second trajectory generator 707B. The first trajectory generator 707A and the second trajectory generator 707B avoid the collision of the first participant 204A and the second participant 204B. There is further shown another first child node 706B of the first parent node 512 and another first child node 708B of the other first parent node 514.

The other first child node 706B is based on the virtual behavior (i.e. take the way (TW)) which is used by the first participant 204A to avoid the collision 602. Therefore, the other first child node 706B of the first parent node 512 stores the virtual behavior of TW as well as the first virtual trajectory 702A of the first participant 204A. Similarly, the other first child node 708B of the other first parent node 514 is based on the virtual behavior (i.e. give the way (GW)) which is used by the second participant 204B to avoid the collision 602. Therefore, the other first child node 708B of the other first parent node 514 stores the virtual behavior of GW as well as the second virtual trajectory 704A of the second participant 204B.

Figure 7D:
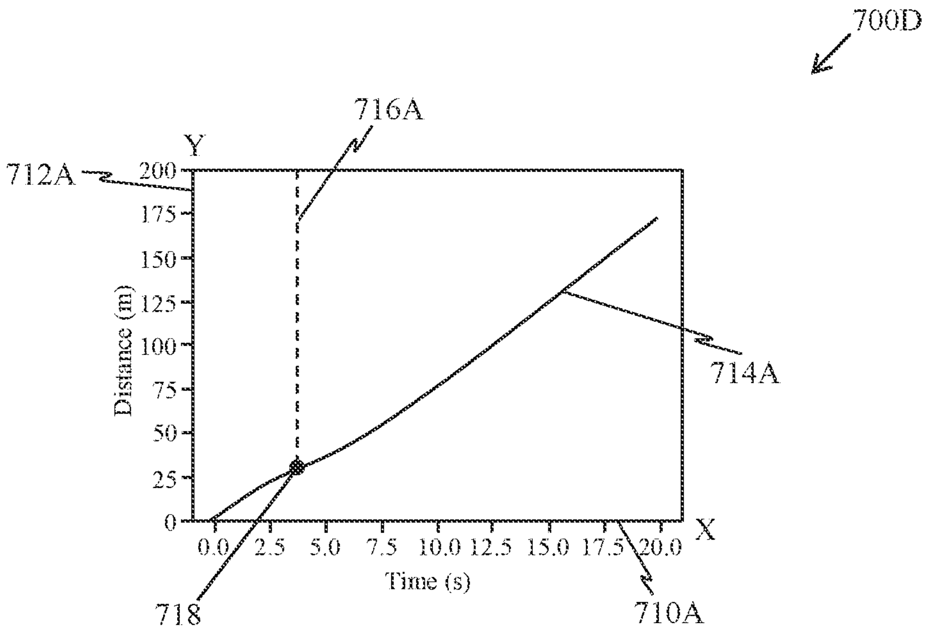
FIG. 7D is a graphical representation that illustrates motion planning of the first participant based on a virtual behavior of give the way, in accordance with an embodiment of the present disclosure.

FIG. 7D is a graphical representation that illustrates motion planning of the first participant based on a virtual behavior of give the way, in accordance with an embodiment of the present disclosure. FIG. 7D is described in conjunction with elements from FIGS. 1, 2, 3, 4, 5D, 6A, 6B, 7A, and 7B. With reference to FIG. 7D, there is shown a graphical representation 700D that illustrates motion planning of the first participant 204A (of FIG. 2) based on a virtual behavior of give the way. The graphical representation 700D includes an X-axis 710A that represents values of time in seconds (s) and a Y-axis 712A that represents values of distance in meter (m).

In the graphical representation 700D, a first line 714A represents a speed profile of the first participant 204A based on the virtual behavior of give the way to the second participant 204B at a T-intersection point 718 to avoid the collision 602. A second line 716A represents that the second participant 204B takes the way at the T-intersection point 718 to avoid the collision 602.

Figure 7E:
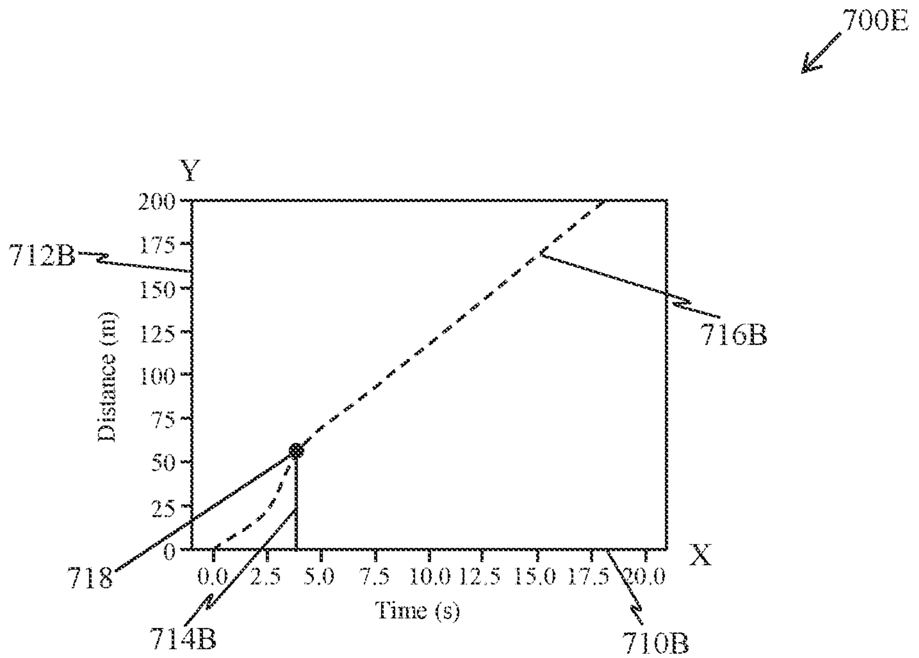
FIG. 7E is a graphical representation that illustrates motion planning of the second participant based on a virtual behavior of take the way, in accordance with an embodiment of the present disclosure.

FIG. 7E is a graphical representation that illustrates motion planning of the second participant based on a virtual behavior of take the way, in accordance with an embodiment of the present disclosure. FIG. 7E is described in conjunction with elements from FIGS. 1, 2, 3, 4, 5D, 6A, 6B, 7A, 7B, and 7D. With reference to FIG. 7E, there is shown a graphical representation 700E that illustrates motion planning of the second participant 204B (of FIG. 2) based on a virtual behavior of take the way. The graphical representation 700E includes an X-axis 710B that represents values of time in seconds (s) and a Y-axis 712B that represents values of distance in meter (m).

In the graphical representation 700E, a first line 716B represents a speed profile of the second participant 204B based on the virtual behavior of take the way from the first participant 204A at the T-intersection point 718 to avoid the collision 602. A second line 714B represents that the first participant 204A gives the way at the T-intersection point 718 to avoid the collision 602.

Figure 7F:
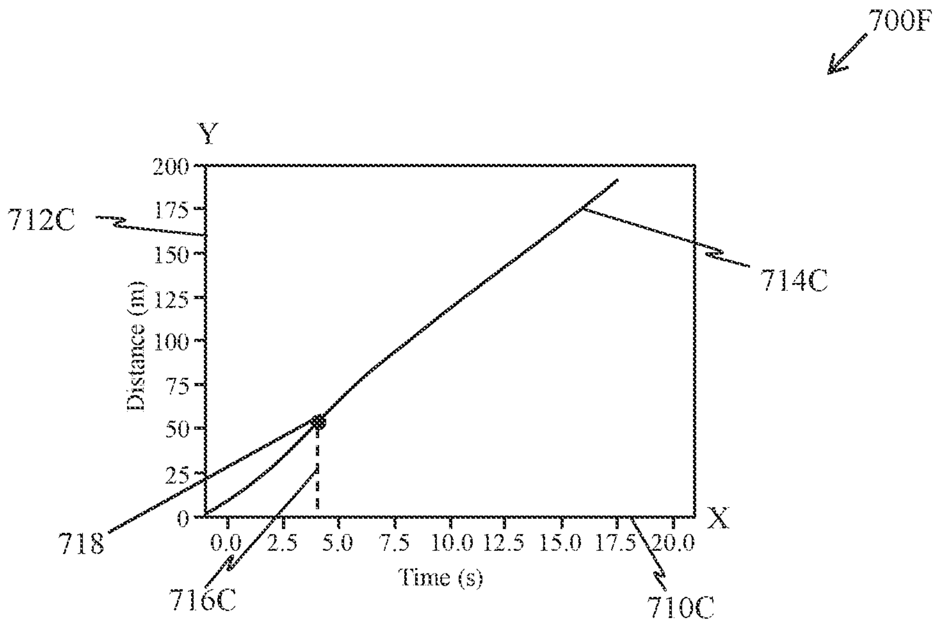
FIG. 7F is a graphical representation that illustrates motion planning of the first participant based on a virtual behavior of take the way, in accordance with an embodiment of the present disclosure.

FIG. 7F is a graphical representation that illustrates motion planning of the first participant based on a virtual behavior of take the way, in accordance with an embodiment of the present disclosure. FIG. 7F is described in conjunction with elements from FIGS. 1, 2, 3, 4, 5D, 6A, 6B, 7A, and 7C. With reference to FIG. 7F, there is shown a graphical representation 700F that illustrates motion planning of the first participant 204A (of FIG. 2) based on a virtual behavior of take the way. The graphical representation 700F includes an X-axis 710C that represents values of time in seconds (s) and a Y-axis 712C that represents values of distance in meter (m).

In the graphical representation 700F, a first line 714C represents a speed profile of the first participant 204A based on the virtual behavior of take the way from the second participant 204B at the T-intersection point 718 to avoid the collision 602. A second line 716C represents that the second participant 204B gives the way at the T-intersection point 718 to avoid the collision 602.

Figure 7G:
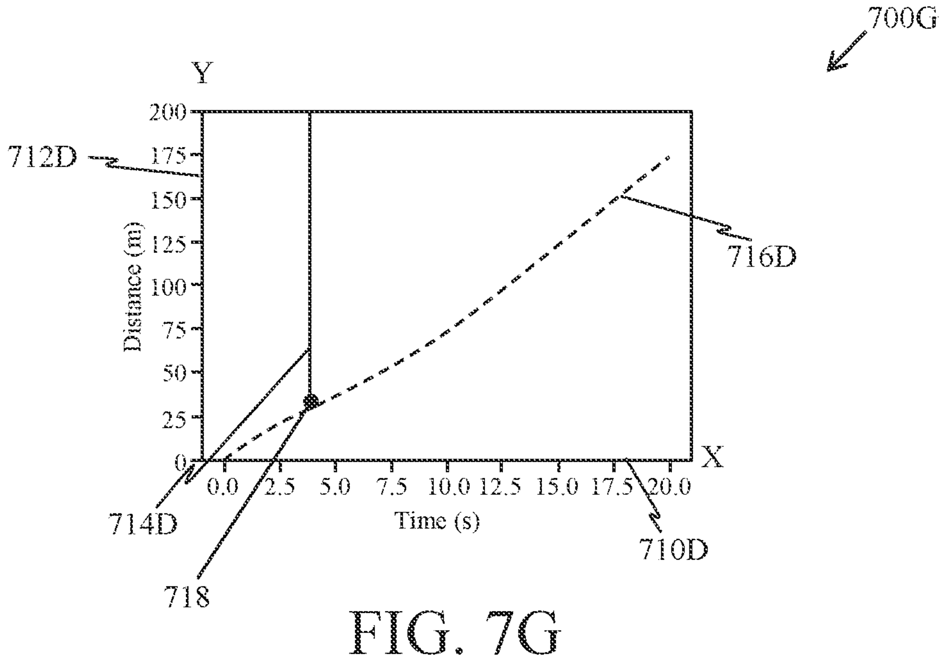
FIG. 7G is a graphical representation that illustrates motion planning of the second participant based on a virtual behavior of give the way, in accordance with an embodiment of the present disclosure.

FIG. 7G is a graphical representation that illustrates motion planning of the second participant based on a virtual behavior of give the way, in accordance with an embodiment of the present disclosure. FIG. 7G is described in conjunction with elements from FIGS. 1, 2, 3, 4, 5D, 6A, 6B, 7A, 7C, and 7F. With reference to FIG. 7G, there is shown a graphical representation 700G that illustrates motion planning of the second participant 204B (of FIG. 2) based on a virtual behavior of give the way. The graphical representation 700G includes an X-axis 710D that represents values of time in seconds (s) and a Y-axis 712D that represents values of distance in meter (m).

In the graphical representation 700G, a first line 716D represents a speed profile of the second participant 204B based on the virtual behavior of give the way to the first participant 204A at the T-intersection point 718 to avoid the collision 602. A second line 714D represents that the first participant 204A takes the way at the T-intersection point 718 to avoid the collision 602.

Figure 8A:
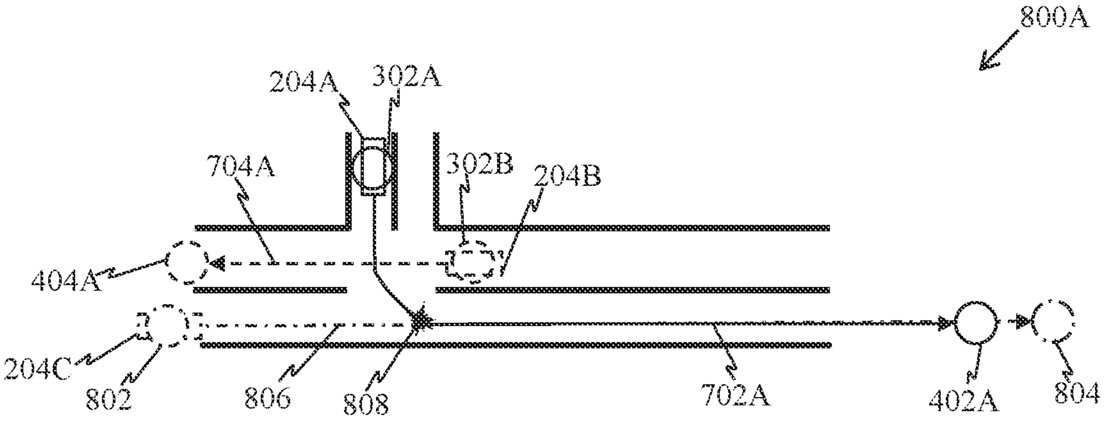
FIG. 8A is an exemplary implementation of a driving scene that depicts a collision of road traffic participants, in accordance with an embodiment of the present disclosure.

FIG. 8A is an exemplary implementation of a driving scene that depicts a collision of road traffic participants, in accordance with a yet another embodiment of the present disclosure. FIG. 8A is described in conjunction with elements from FIGS. 1, 2, 3, 4, 5A, 6A, and 7A. With reference to FIG. 8A, there is shown an exemplary implementation of a driving scene 800A that includes a third participant 204C. There is further shown a third recorded initial position 802, a third virtual final position 804, and a third virtual trajectory 806 of the third participant 204C. There is further shown a collision 808 between the first participant 204A and the third participant 204C.

The third recorded initial position 802 is referred to as a starting location of the third participant 204C, and similarly, the third virtual final position 804 is referred to as a possible hypothetical future position or a possible future destination, and the like. In the driving scene 800A, the third participant 204C follows the third virtual trajectory 806 based on a virtual behavior of keep speed same (KS) from the third recorded initial position 802 to the third virtual final position 804 and does not negotiate with the first participant 204A. As a consequence, the third participant 204C meets the collision 808 with the first participant 204A at a trajectory point.

Figure 8B:
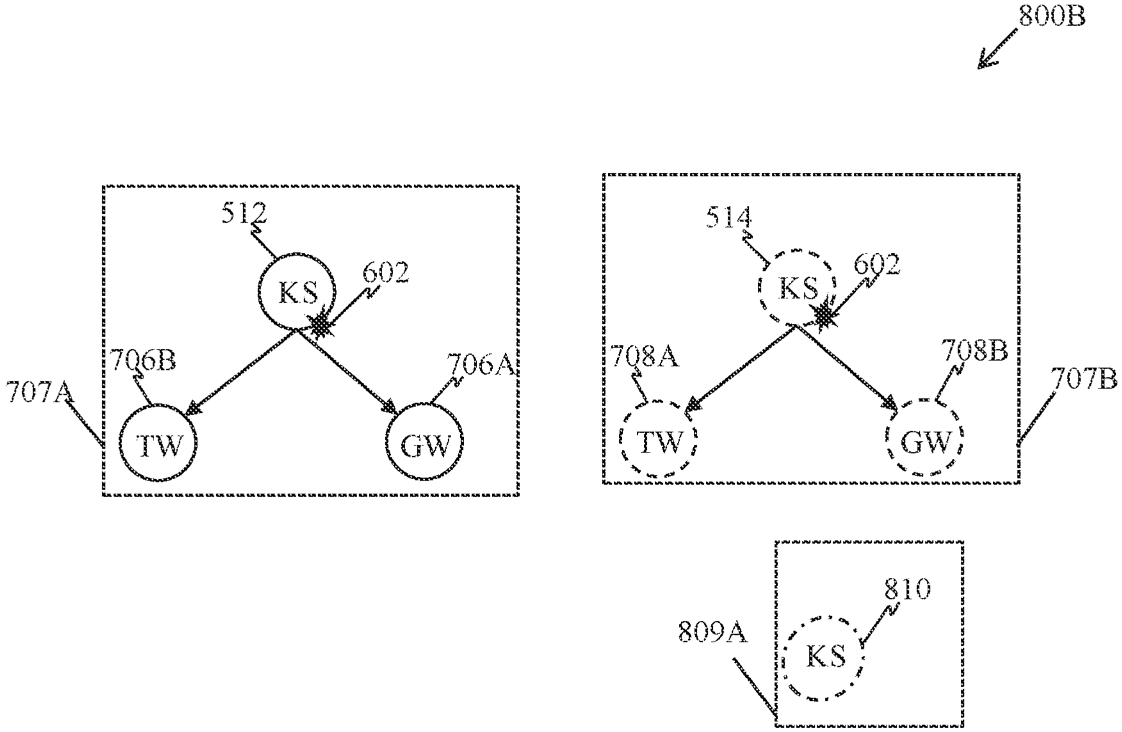
FIG. 8B is scenario that depicts trajectory generators of the road traffic participants, in accordance with an embodiment of the present disclosure.

FIG. 8B is scenario that depicts trajectory generators of the road traffic participants, in accordance with a yet another embodiment of the present disclosure. FIG. 8B is described in conjunction with elements from FIGS. 1, 2, 3, 4, 5D, 6A, 6B, 7A, 7B, 7C, and 8A. With reference to FIG. 8B there is shown a scenario 800B that includes the first trajectory generator 707A of the first participant 204A, the second trajectory generator 707B of the second participant 204B and a third trajectory generator 809A of the third participant 204C. There is further shown a parent node 810 of the third trajectory generator 809A of the third participant 204C.

The parent node 810 is related to the third participant 204C and stores a plurality of virtual behaviors, the third virtual trajectory 806, a speed profile, and a spatial path of the third participant 204C. For example, at the trajectory point, the third participant 204C does not negotiate or interact with the first participant 204A and move on with the same speed. In such a case, the parent node 810 of the third trajectory generator 809A stores a virtual behavior of keep speed same (KS) of the third participant 204C at a root level.

Figure 8C:
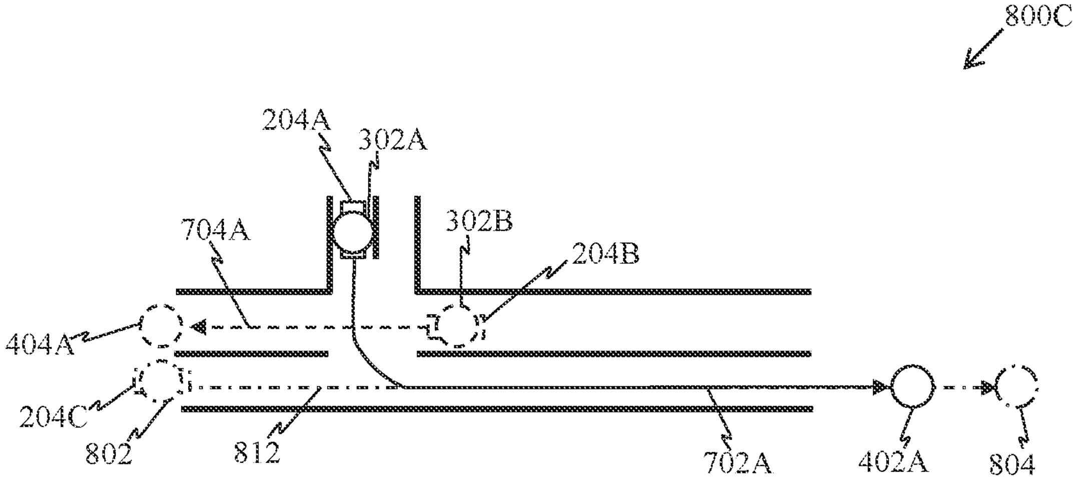
FIG. 8C is an exemplary implementation of a driving scene that avoids a collision of road traffic participants, in accordance with an embodiment of the present disclosure.

FIG. 8C is an exemplary implementation of a driving scene that avoids a collision of road traffic participants, in accordance with a yet another embodiment of the present disclosure. FIG. 8C is described in conjunction with elements from FIGS. 1, 2, 3, 4, 5A, 6A, 7A, and 8A. With reference to FIG. 8C there is shown an exemplary implementation of a driving scene 800C that includes a fourth virtual trajectory 812 of the third participant 204C.

The fourth virtual trajectory 812 of the third participant 204C is computed based on the plurality of virtual behaviors of the first participant 204A and third participant 204C which are used to avoid the collision 808. The first participant 204A and the third participant 204C can avoid the collision by interacting or negotiating with each other. In an example, at the trajectory point (of FIG. 8A), the first participant 204A gives the way (GW) to the third participant 204C, and follows the first virtual trajectory 702A. Consequently, the third participant 204C takes the way (TW) form the first participant 204A and follows the fourth virtual trajectory 812. In this way, the collision 808 is avoided based on the virtual behaviors of giving the way of the first participant 204A and taking the way of the third participant 204C. The trajectory generators based on the virtual behaviors of giving the way of the first participant 204A and taking the way of the third participant 204C are described in detail, for example, in FIG. 8E. In another example, at the trajectory point (of FIG. 8A), the first participant 204A takes the way (TW) from the third participant 204C and follows the first virtual trajectory 702A. Consequently, the third participant 204C gives the way (GW) to the first participant 204A and follows the fourth virtual trajectory 812. In this way, the collision 808 is avoided based on the virtual behaviors of the taking the way of the first participant 204A and giving the way of the third participant 204C. The trajectory generators based on the virtual behavior (i.e. TW) of the first participant 204A and giving the way of the third participant 204C are described in detail, for example, in FIG. 8D. In this way, the collision 808 is avoided based on the plurality of virtual behaviors (i.e. giving the way or taking the way) of the first participant 204A and the third participant 204C.

Figure 8D:
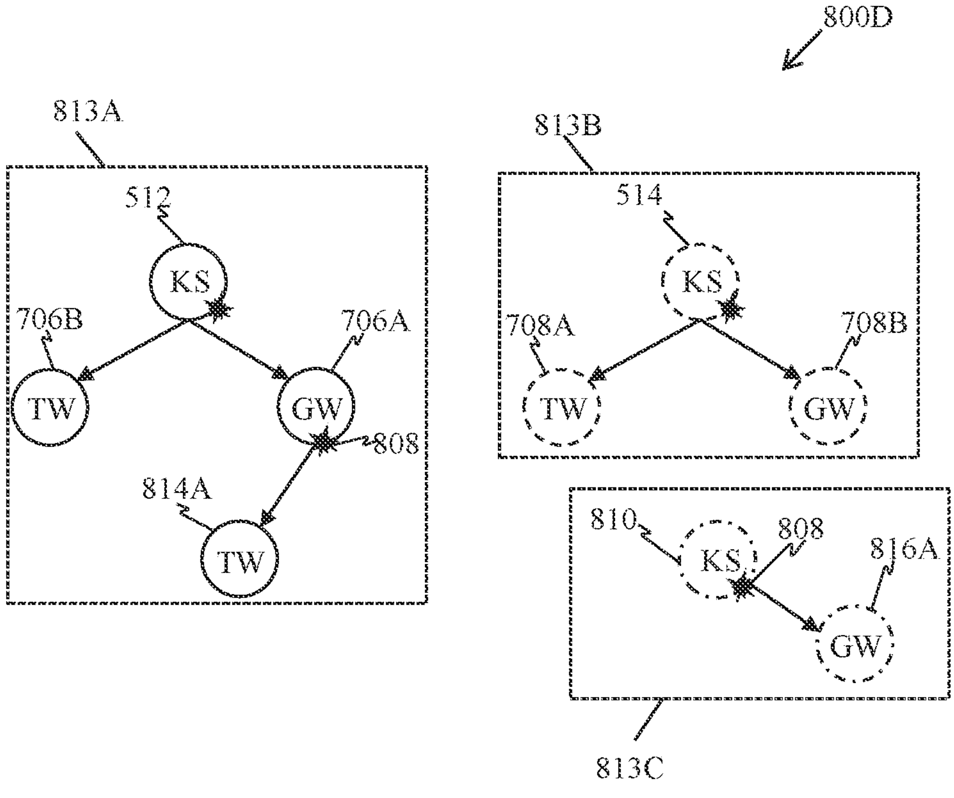
FIG. 8D is a scenario that depicts trajectory generators which avoids the collision of the road traffic participants, in accordance with an embodiment of the present disclosure.

FIG. 8D is a scenario that depicts trajectory generators which avoids the collision of the road traffic participants, in accordance with an embodiment of the present disclosure. FIG. 8D is described in conjunction with elements from FIGS. 1, 2, 3, 4, 5D, 6A, 6B, 7A, 8A, 8B and 8C. With reference to FIG. 8D there is shown a scenario 800D that includes a first trajectory generator 813A of the first participant 204A, a second trajectory generator 813B of the second participant 204B and a third trajectory generator 813C of the third participant 204C. There is further shown a first sub-child node 814A of the first parent node 512 of the first trajectory generator 813A and a first child node 816A of the parent node 810 of the third trajectory generator 813C. The second trajectory generator 813B corresponds to the second trajectory generator 707B (of FIG. 7C) of the second participant 204B.

The first sub-child node 814A is based on a virtual behavior of take the way (TW) which is used by the first participant 204A to avoid the collision 808. Therefore, the first sub-child node 814A of the first child node 706A of the first parent node 512 stores the virtual behavior of TW as well as the first virtual trajectory 702 of the first participant 204A. Similarly, the first child node 816A of the parent node 810 is based on a virtual behavior of give the way (GW) which is used by the third participant 204C to avoid the collision 808. Therefore, the first child node 816A of the parent node 810 stores the virtual behavior of GW as well as the fourth virtual trajectory 812 of the third participant 204C.

Figure 8E:
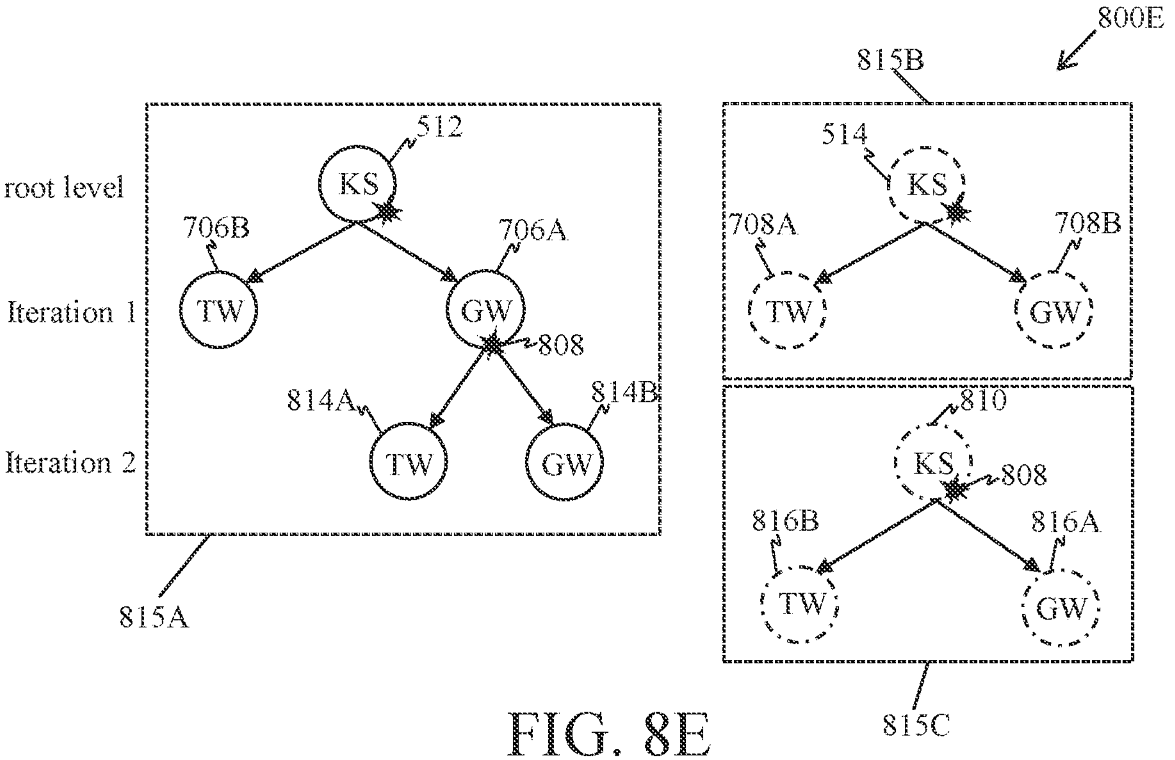
FIG. 8E is a scenario that depicts trajectory generators which avoid the collision of the road traffic participants, in accordance with an embodiment of the present disclosure.

FIG. 8E is a scenario that depicts trajectory generators which avoid the collision of the road traffic participants, in accordance with a yet another embodiment of the present disclosure. FIG. 8E is described in conjunction with elements from FIGS. 1, 2, 3, 4, 5D, 6A, 6B, 7A, 8A, 8B, 8C, and 8D. With reference to FIG. 8E there is shown a scenario 800E that includes a first trajectory generator 815A of the first participant 204A, a second trajectory generator 815B of the second participant 204B and a third trajectory generator 815C of the third participant 204C. There is further shown another first sub-child node 814B of the first parent node 512 of the first trajectory generator 815A and another first child node 816B of the parent node 810 of the third trajectory generator 815C. The second trajectory generator 815B corresponds to the second trajectory generator 707B (of FIG. 7C) of the second participant 204B.

The other first sub-child node 814B is based on a virtual behavior of giving the way (GW) of the first participant 204A to avoid the collision 808. Therefore, the other first sub-child node 814B of the first child node 706A stores the virtual behavior of giving the way as well as the first virtual trajectory 702A of the first participant 204A. Similarly, the other first child node 816B of the parent node 810 is based on a virtual behavior of taking the way (TW) by the third participant 204C to avoid the collision 808. Therefore, the other first child node 816B of the parent node 810 stores the virtual behavior of taking the way as well as the fourth virtual trajectory 812 of the third participant 204C.

Figure 8F:
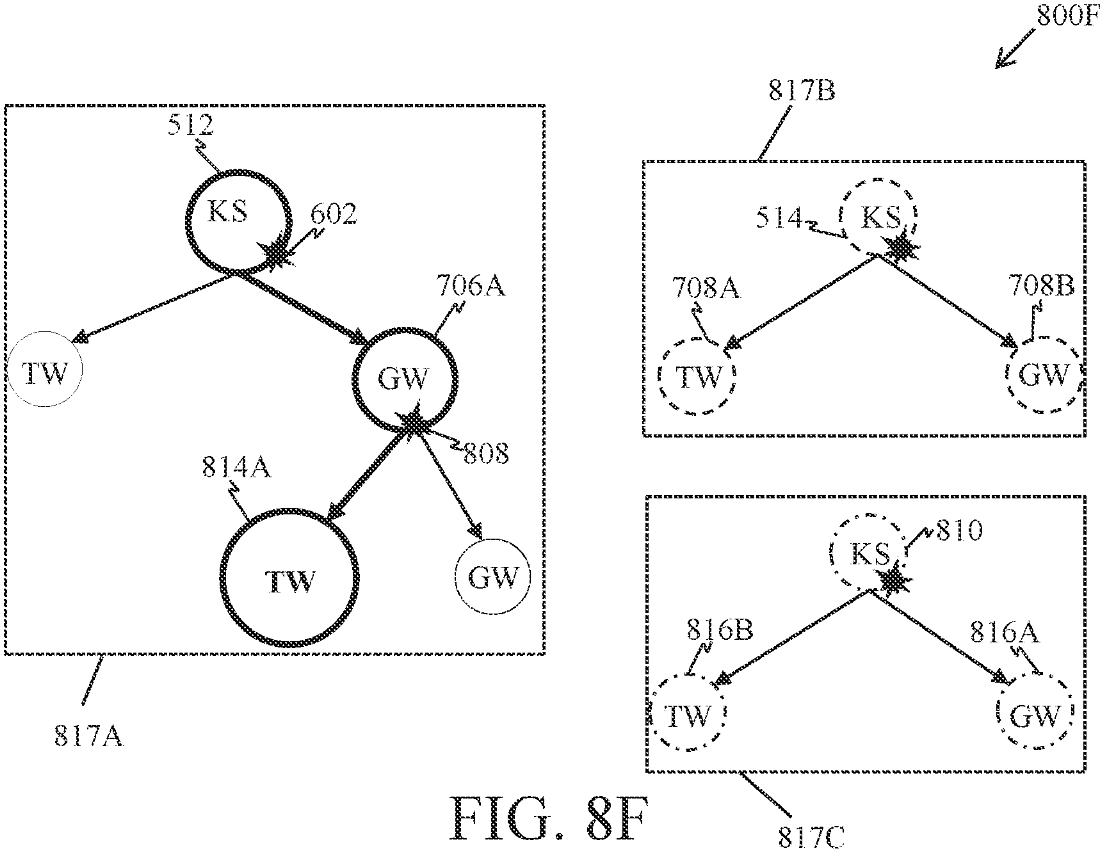
FIG. 8F is a scenario that depicts trajectory generators which avoids the collision of the road traffic participants, in accordance with an embodiment of the present disclosure.

FIG. 8F is a scenario that depicts trajectory generators which avoids the collision of the road traffic participants, in accordance with a yet another embodiment of the present disclosure. FIG. 8F is described in conjunction with elements from FIGS. 1, 2, 3, 4, 5D, 6A, 6B, 7A, 8A, 8B, 8C, 8D, and 8E. With reference to FIG. 8F, there is shown a scenario 800F that includes a first trajectory generator 817A of the first participant 204A, a second trajectory generator 817B of the second participant 204B and a third trajectory generator 817C of the third participant 204C.

Each of the first trajectory generator 817A, the second trajectory generator 817B and the third trajectory generator 817C stores the plurality of virtual behaviors and the plurality of virtual trajectories of each of the first participant 204A, the second participant 204B and the third participant 204C, respectively. For example, in the first trajectory generator 817A of the first participant 204A, the first parent node 512 stores the virtual behavior of keep speed same of the first participant 204A and the virtual trajectory 502A. The first child node 706A stores the virtual behavior of giving the way of the first participant 204A and the first virtual trajectory 702A to avoid the collision 602 with the second participant 204B. The first sub-child node 814A stores the virtual behavior of taking the way of the first participant 204A and the first virtual trajectory 702A to avoid the collision 808 with the third participant 204C. The first trajectory generator 817A of the first participant 204A avoids the collision 602 (of FIG. 6A) with the second participant 204B and the collision 808 with the third participant 204C. The second trajectory generator 817B of the second participant 204B avoids the collision 602 (of FIG. 6A) with the first participant 204A. The third trajectory generator 817C of the third participant 204C avoids the collision 808 with the first participant 204A.

Figure 8G:
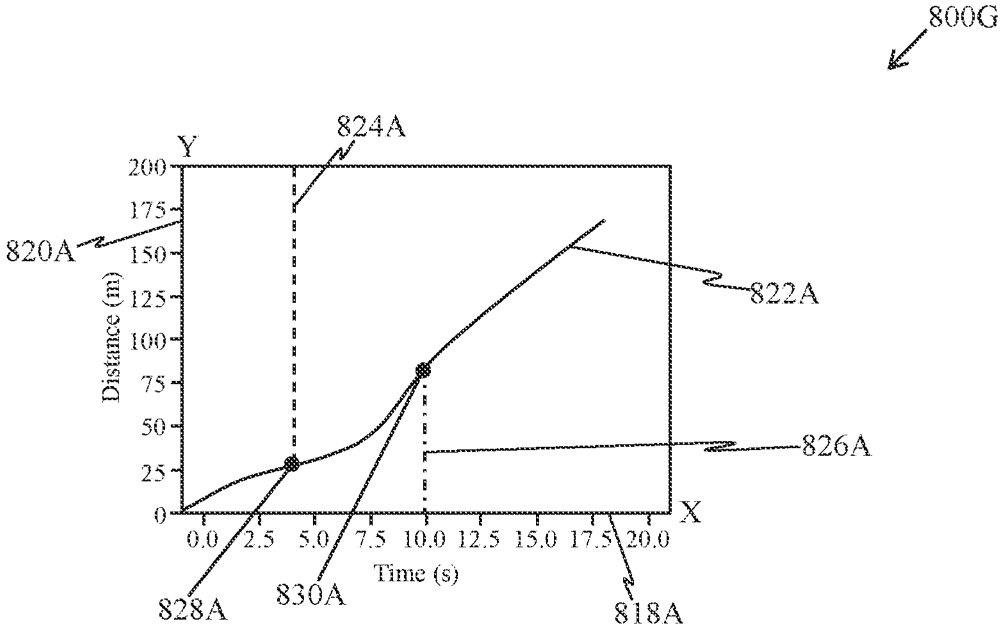
FIG. 8G is a graphical representation that illustrates motion planning of road traffic participants, in accordance with an embodiment of the present disclosure.

FIG. 8G is a graphical representation that illustrates motion planning of road traffic participants, in accordance with an embodiment of the present disclosure. FIG. 8G is described in conjunction with the elements from FIGS. 1, 2, 3, 4, 5D, 6A, 6B, 7A, 8A, 8B, 8C, 8D, 8E, and 8F. With reference to FIG. 8G there is shown a graphical representation 800G that illustrates motion planning of road traffic participants such as the first participant 204A, the second participant 204B and the third participant 204C in spatio-temporal region. The graphical representation 800G includes an X-axis 818A that represents values of time in seconds (s), and Y-axis 820A that represents values of distance in meter (m).

In the graphical representation 800G, a first line 822A represents a speed profile of the first participant 204A based on the virtual behavior of give the way to the second participant 204B at a T-intersection point 828A to avoid the collision 602, and take the way from the third participant 204C at a trajectory point 830A to avoid the collision 808. A second line 824A represents that the second participant 204B takes the way from the first participant 204A at the T-intersection point 828A to avoid the collision 602. A third line 826A represents that the third participant 204C gives the way to the first participant 204A at the trajectory point 830A to avoid the collision 808.

Figure 8H:
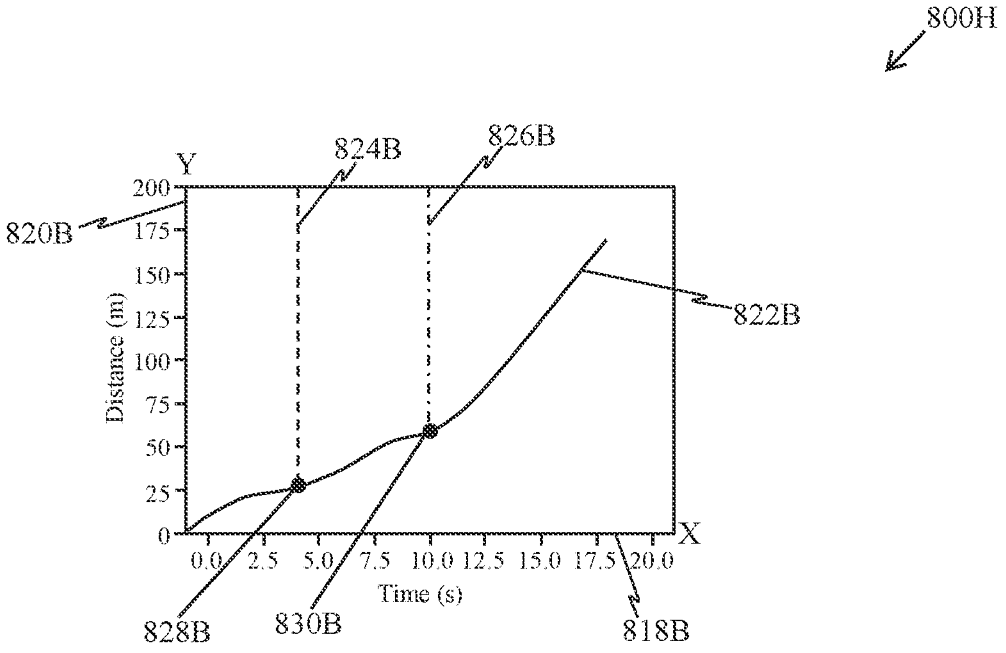
FIG. 8H is a graphical representation that illustrates motion planning of road traffic participants, in accordance with an embodiment of the present disclosure.

FIG. 8H is a graphical representation that illustrates motion planning of road traffic participants, in accordance with an embodiment of the present disclosure. FIG. 8H is described in conjunction with the elements from FIGS. 1, 2, 3, 4, 5D, 6A, 6B, 7A, 8A, 8B, 8C, 8D, 8E, 8F, and 8G. With reference to FIG. 8H there is shown a graphical representation 800H of motion planning of road traffic participants such as the first participant 204A, the second participant 204B and the third participant 204C in spatio-temporal region. The graphical representation 800H includes an X-axis 818B that represents values of time in seconds (s), and Y-axis 820B that represents values of distance in meter (m).

In the graphical representation 800H, a first line 822B represents a speed profile of the first participant 204A based on the virtual behavior of give the way to the second participant 204B at a T-intersection point 828B to avoid the collision 602, and give the way to the third participant 204C at a trajectory point 830B to avoid the collision 808. A second line 824B represents that the second participant 204B takes the way from the first participant 204A at the T-intersection point 828B to avoid the collision 602. A third line 826B represents that the third participant 204C takes the way from the first participant 204A at the trajectory point 830B to avoid the collision 808.

Figure 9A:
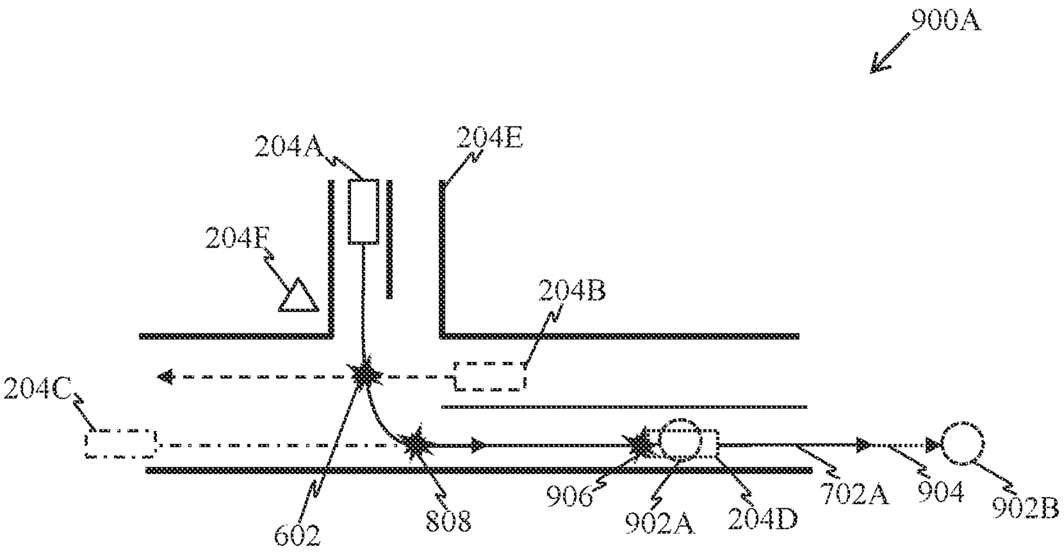
FIG. 9A is an exemplary implementation of a driving scene that depicts a collision of road traffic participants, in accordance with an embodiment of the present disclosure.

FIG. 9A is an exemplary implementation of a driving scene that depicts a collision of road traffic participants, in accordance with a yet another embodiment of the present disclosure. FIG. 9A is described in conjunction with elements from FIGS. 1, 2, 3, 4, 5A, 6A, 7A, 8A, and 8C. With reference to FIG. 9A, there is shown an exemplary implementation of a driving scene 900A that includes a fourth participant 204D. There is further shown a fourth recorded initial position 902A, a fourth virtual final position 902B, and a fourth virtual trajectory 904 of the fourth participant 204D. There is further shown a collision 906 between the first participant 204A and the fourth participant 204D.

The fourth recorded initial position 902A is referred to as a starting location of the fourth participant 204D, and similarly, the fourth virtual final position 902B is referred to as a possible hypothetical future position or a possible future destination, and the like. In the driving scene 900A, the fourth participant 204D follows the fourth virtual trajectory 904 based on a virtual behavior of keep speed same (KS) from the fourth recorded initial position 902A to the fourth virtual final position 902B and does not negotiate with the first participant 204A. As a consequence, the fourth participant 204D meets the collision 906 with the first participant 204A at another trajectory point.

Figure 9B:
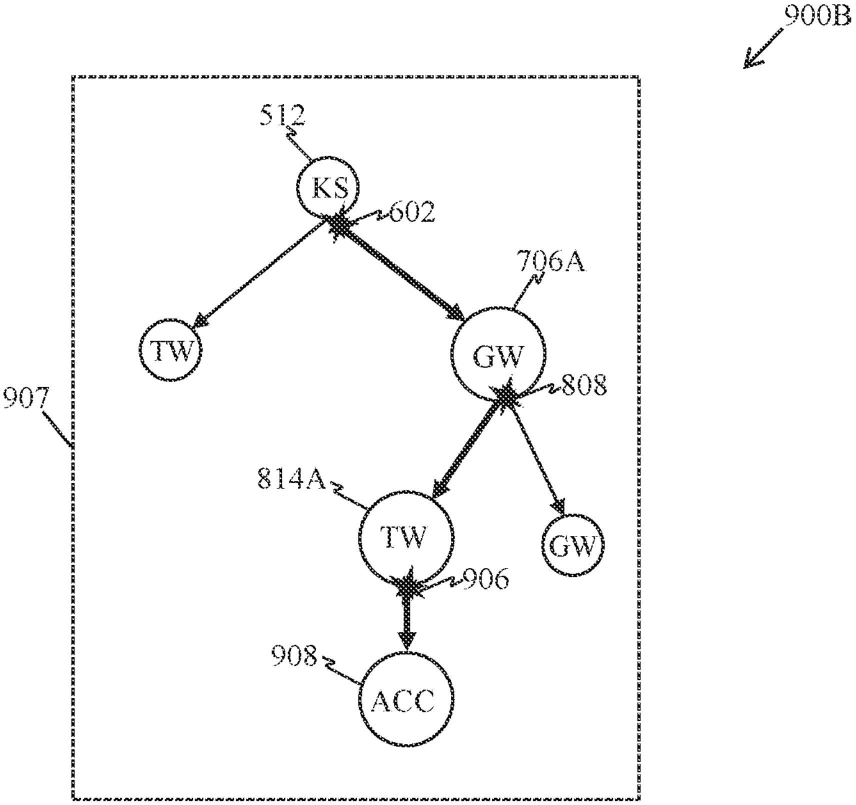
FIG. 9B is scenario that depicts trajectory generators of the road traffic participants, in accordance with an embodiment of the present disclosure.

FIG. 9B is scenario that depicts trajectory generators of the road traffic participants, in accordance with an embodiment of the present disclosure. FIG. 9B is described in conjunction with elements from FIGS. 1, 2, 3, 4, 5D, 6A, 6B, 7A, 7B, 7C, 8A, 8C, and 9A. With reference to FIG. 9B there is shown a scenario 900B that includes a trajectory generator 907 of the first participant 204A. There is further shown a second sub-child node 908 of the first parent node 512 of the trajectory generator 907.

The second sub-child node 908 stores a virtual behavior of adaptive cruise control (ACC) of the first participant 204A. Due to the virtual behavior of adaptive cruise control, the first participant 204A is configured to slow down to avoid the collision 906 with the fourth participant 204D and to follow the fourth participant 204D on the fourth virtual trajectory 904. Therefore, the second sub-child node 908 of the first sub-child node 814 of the first child node 706A of the first parent node 512 of the trajectory generator 907 stores the virtual behavior of adaptive cruise control (ACC) of the first participant 204A.

Figure 9C:
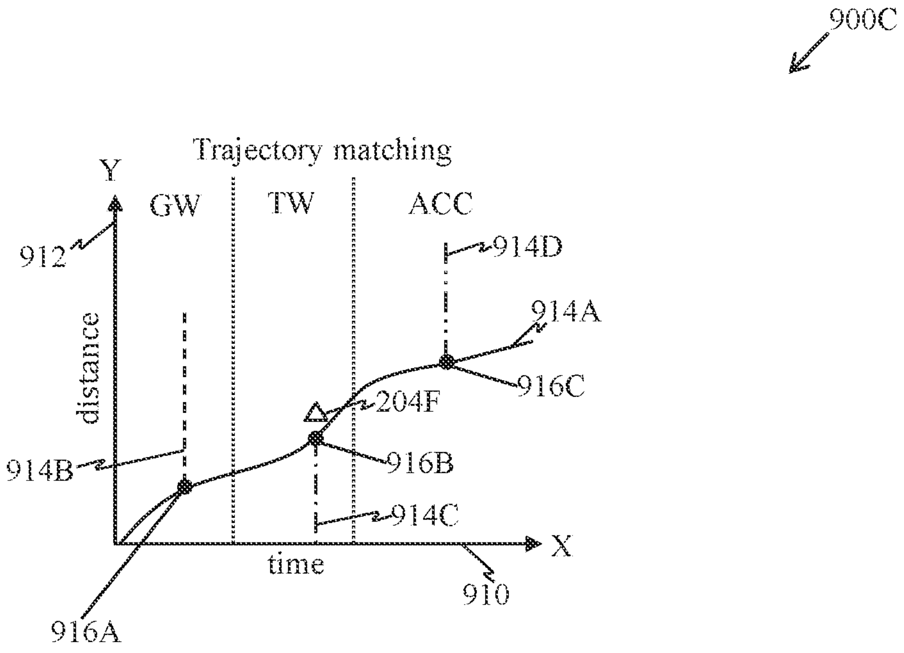
FIG. 9C is a graphical representation that illustrates motion planning of road traffic participants, in accordance with an embodiment of the present disclosure.

FIG. 9C is a graphical representation that illustrates motion planning of road traffic participants, in accordance with an embodiment of the present disclosure. FIG. 9C is described in conjunction with the elements from FIGS. 1, 2, 3, 4, 5D, 6A, 6B, 7A, 7B, 7C, 8A, 8C, 9A, and 9B. With reference to FIG. 9C there is shown a graphical representation 900C that illustrates motion planning of road traffic participants such as the first participant 204A, the second participant 204B, the third participant 204C, and the fourth participant 204D in spatio-temporal region. The graphical representation 900C includes an X-axis 910 that represents values of time in seconds (s), and Y-axis 912 that represents values of distance in meter (m).

In the graphical representation 900C, a first line 914A represents a speed profile of the first participant 204A based on the virtual behavior of give the way to the second participant 204B at a T-intersection point 916A to avoid the collision 602, take the way from the third participant 204C at a trajectory point 916B to avoid the collision 808, and finally on the adaptive cruise control (ACC) to avoid the collision 906 with the fourth participant 204D at a trajectory point 916C. A second line 914B represents that the second participant 204B takes the way from the first participant 204A at the T-intersection point 916A to avoid the collision 602. A third line 914C represents that the third participant 204C gives the way to the first participant 204A at the trajectory point 916B to avoid the collision 808. A fourth line 914D represents that the fourth participant 204D keep speed same at the trajectory point 916C. Additionally, at the trajectory point 916C, the first participant 204A is configured to slow down because of the virtual behavior of the adaptive cruise control, in order to avoid the collision 906 with the fourth participant 204D and follow the fourth participant 204D on the fourth virtual trajectory 904.

Figure 9D:
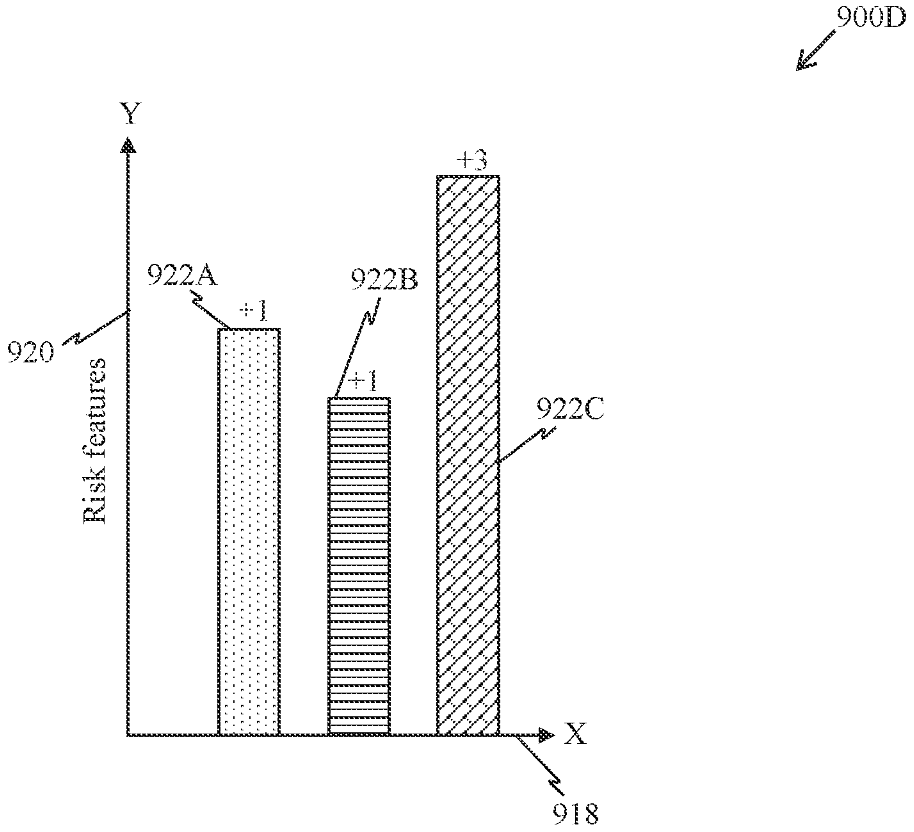
FIG. 9D is a graphical representation that illustrates a count of collision risk features of the first participant, in accordance with an embodiment of the present disclosure.

FIG. 9D is a graphical representation that illustrates a count of collision risk features of the first participant, in accordance with an embodiment of the present disclosure. FIG. 9D is described in conjunction with the elements from FIGS. 1, 2, 9A, 9B, and 9C. With reference to FIG. 9D, there is shown a graphical representation 900D that illustrates a count of collision risk features of the first participant 204A. The graphical representation 900D includes an X-axis 918 which represents a plurality of collision risk features of the first participant 204A and a Y-axis 920 which represents count of the plurality of collision risk features of the first participant 204A.

In an exemplary implementation, the overall accident risk level is associated with the virtual behavior and the corresponding virtual trajectory of the first participant 204A. Therefore, the overall accident risk level depends on count of the plurality of collision risk features such as a count (e.g. 1) of the number of broken traffic rules 922A by the first participant 204A in every 100 km of driving, a count (e.g. 1) of take the way (TW) 922B, and a count (e.g. 3) of number of accidents 922C performed by the first participant 204A. The overall accident risk level is updated according to the recorded trajectory (i.e. actual maneuvers) performed by the first participant 204A, where the overall accident risk level is obtained by linearly combining all the accident risk levels associated with the first participant 204A. In an example, the overall accident risk level (i.e. collision risk value), each accident risk level is normalized with respect to the average population of the overall accident risk level, which is performed in a leverage large datasets usually available to the automotive insurance provider.

Figure 10A:
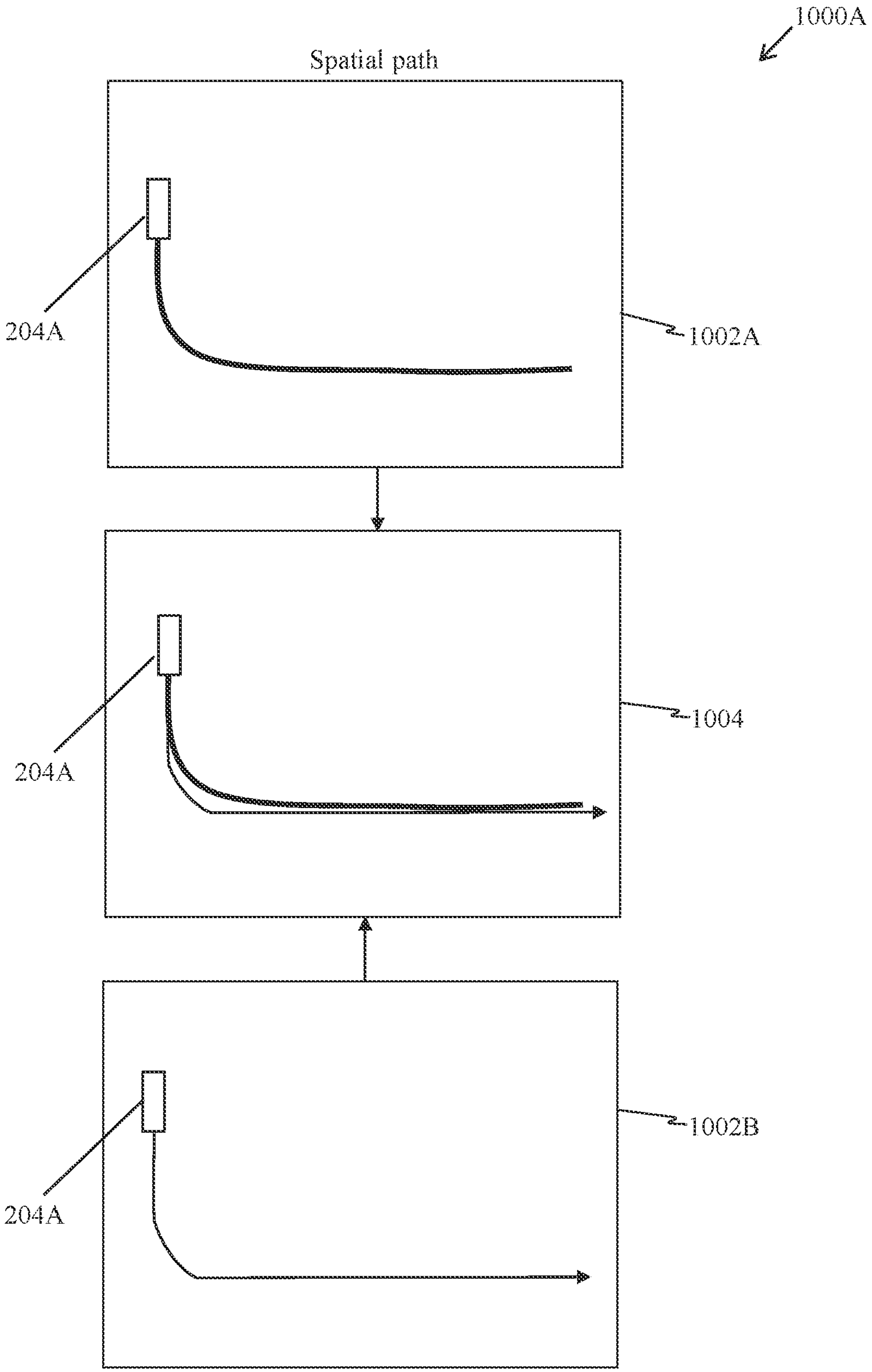
FIG. 10A is a graphical representation that illustrates trajectory matching of the first participant in terms of spatial path, in accordance with an embodiment of the present disclosure.

FIG. 10A is a graphical representation that illustrates trajectory matching of the first participant in terms of spatial path, in accordance with an embodiment of the present disclosure. FIG. 10A is described in conjunction with elements from FIGS. 1, 2, and 8A-8H. With reference to FIG. 10A there is shown a graphical representation 1000A that illustrates trajectory matching of the first participant 204A (of FIG. 2A) in terms of spatial path. The graphical representation 1000A includes a recorded trajectory 1002A, a virtual trajectory 1002B, and a matching profile 1004 of the first participant 204A in spatial path region.

The recorded trajectory 1002A corresponds to an actual trajectory performed by the first participant 204A. The virtual trajectory 1002B corresponds to a trajectory of a plurality of virtual trajectories which are generated by use of the trajectory generator (e.g. the trajectory generator 817A). The matching profile 1004 is used to find a most similar trajectory (e.g. the virtual trajectory 1002B) of the plurality of virtual trajectories to the recorded trajectory 1002A. The matching profile 1004 represents that how much the recorded trajectory 1002A matches with the virtual trajectory 1002B of the first participant 204A. The match between the recorded trajectory 1002A and the virtual trajectory 1002B is performed based on a distance-based similarity metric. On the basis of the match between the recorded trajectory 1002A and the virtual trajectory 1002B, an actual maneuver of the first participant 204A can be automatically interpreted.

Figure 10B:
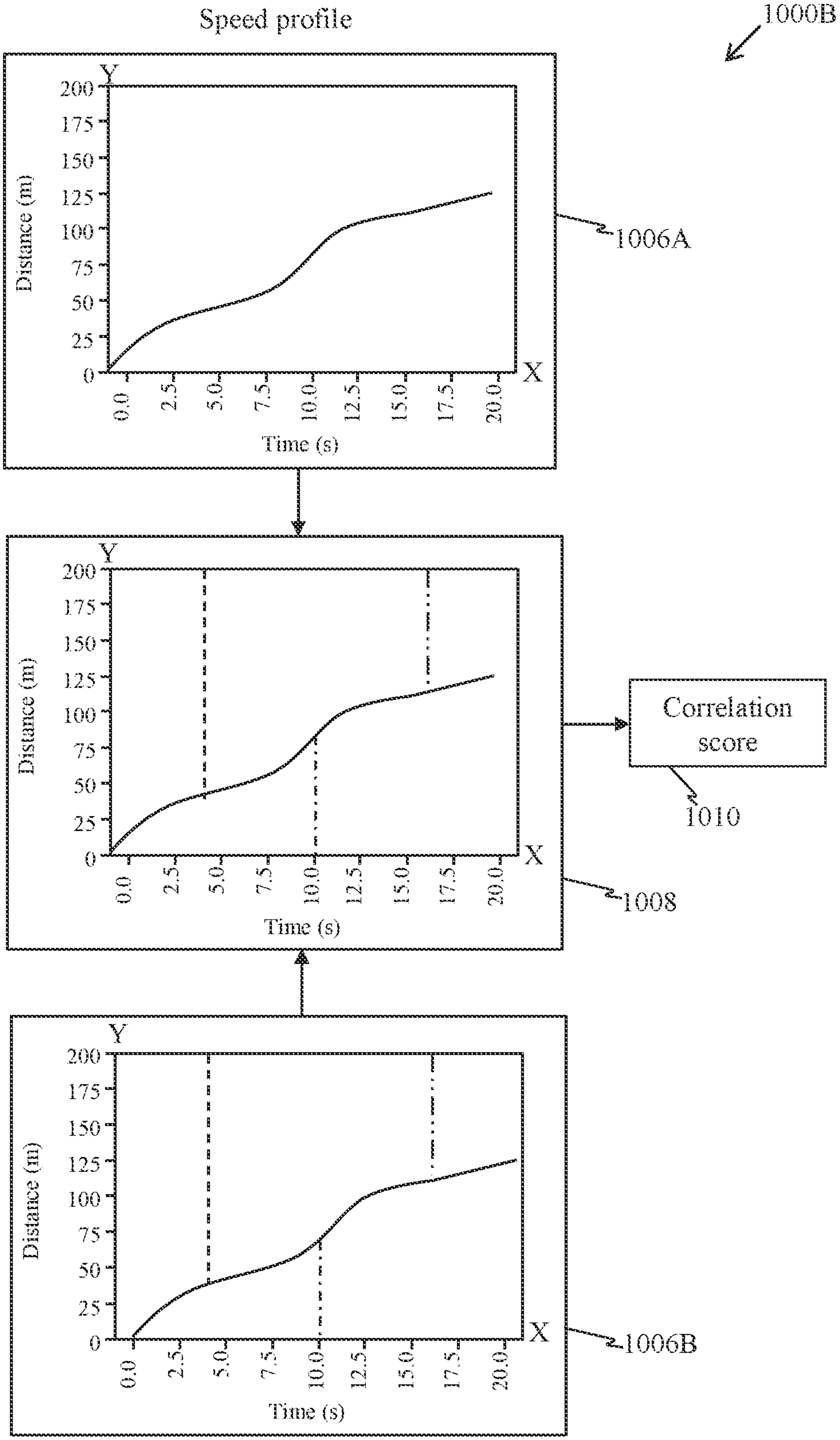
FIG. 10B is a graphical representation that illustrates trajectory matching of the first participant in spatio-temporal region, in accordance with an embodiment of the present disclosure.

FIG. 10B is a graphical representation that illustrates trajectory matching of the first participant in spatio-temporal region, in accordance with an embodiment of the present disclosure. FIG. 10B is described in conjunction with elements from FIGS. 1, 2, 8A-8H, and 10A. With reference to FIG. 10B there is shown a graphical representation 1000B that illustrates trajectory matching of the first participant 204A (of FIG. 2A) in spatio-temporal region. The graphical representation 1000B includes a recorded speed profile 1006A, a virtual speed profile 1006B, another matching profile 1008, and a correlation score 1010 of the first participant.

The recorded speed profile 1006A corresponds to an actual speed profile (i.e. spatial positions with respect to time) of the first participant 204A. The recorded speed profile 1006A is based on the recorded trajectory 1002A of the first participant 204A. The virtual speed profile 1006B is based on the virtual trajectory 1002B of the first participant 204A. The virtual speed profile 1006B is also based on a plurality of virtual behaviors (e.g. give the way, take the way and the like) of the first participant 204A. The other matching profile 1008 is used to find a most similar speed profile (e.g. the virtual speed profile 1006B) of the plurality of virtual speed profiles to the recorded speed profile 1006A. The other matching profile 1008 represents that how much the recorded speed profile 1006A matches with the virtual speed profile 1006B of the first participant 204A. On the basis of the match between the recorded speed profile 1006A and the virtual speed profile 1006B of the first participant 204A, the correlation score 1010 is generated. The correlation score 1010 leads to an automatic interpretation of an actual maneuver of the first participant 204A.

Figure 10C:
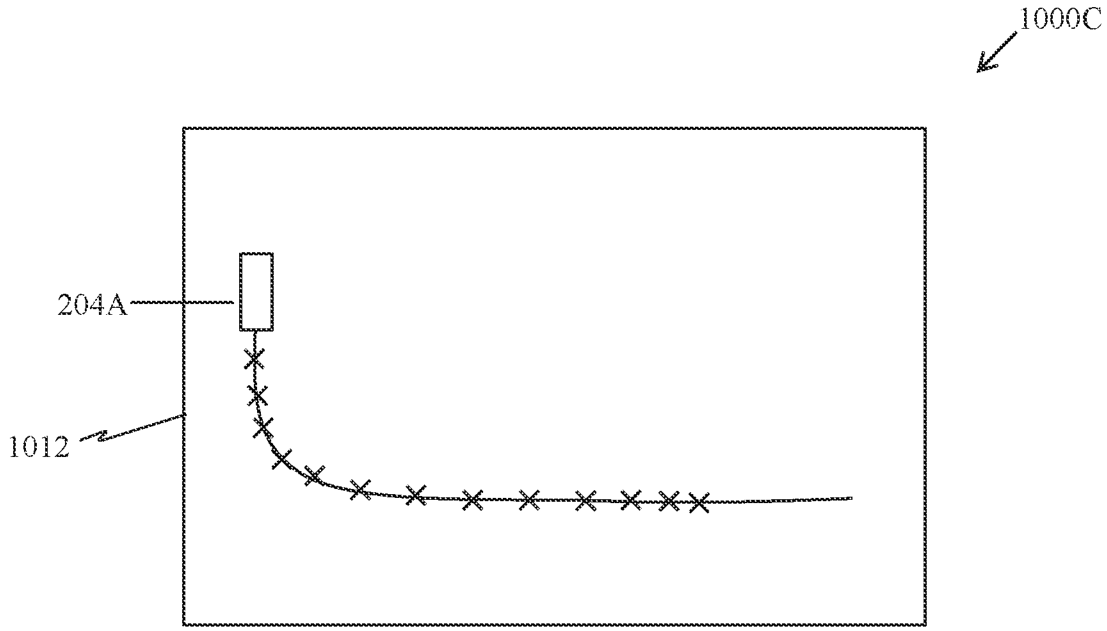
FIG. 10C is a graphical representation that illustrates a matching score of the first participant in spatial path region, in accordance with an embodiment of the present disclosure.

FIG. 10C is a graphical representation that illustrates a matching score of the first participant in spatial path region, in accordance with an embodiment of the present disclosure. FIG. 10C is described in conjunction with elements from FIGS. 1, 2, 8A-8H, 10A, and 10B. With reference to FIG. 10C there is shown a graphical representation 1000C that illustrates a matching score 1012 of the first participant 204A in spatial path region. The matching score 1012 is obtained by taking samples from the recorded trajectory 1002A of the first participant 204A at every time step (e.g. at every 1 s). The coordinates of sampling instants of the recorded trajectory 1002A are compared with sampling instants of the plurality of virtual trajectories of the first participant 204A. Based on the comparison, a virtual trajectory (e.g. the virtual trajectory 1002B) of the plurality of virtual trajectories which exhibits a lowest distance with recorded trajectory 1002A is selected. The selected virtual trajectory exhibits a highest matching score with the recorded trajectory 1002A of the first participant 204A.

Figure 10D:
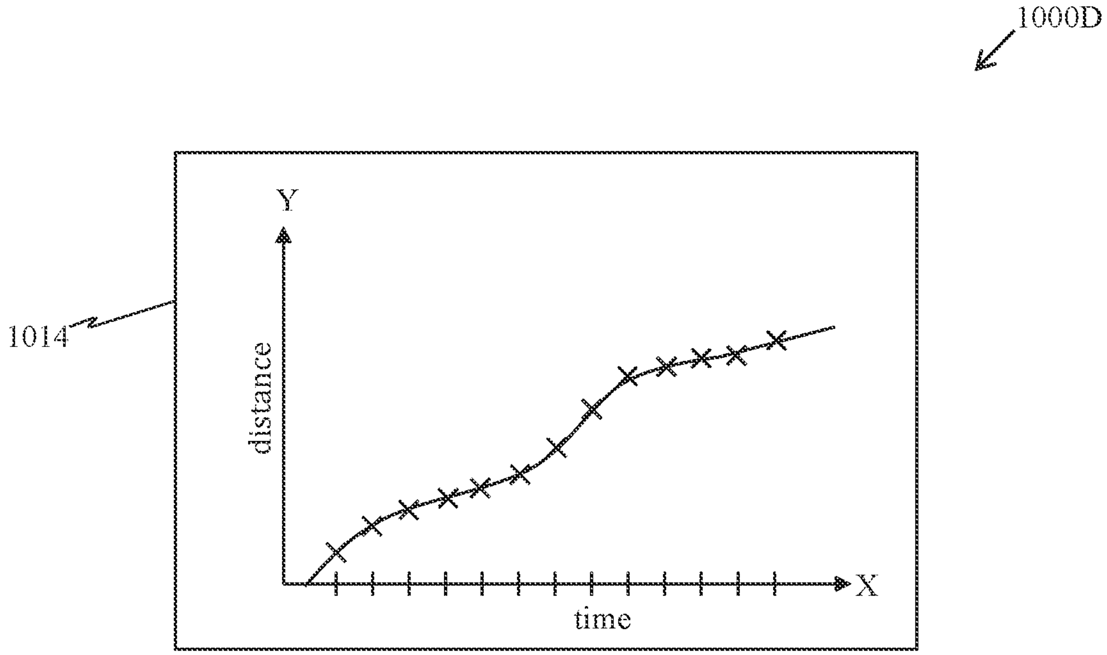
FIG. 10D is a graphical representation that illustrates a matching score of the first participant in spatio-temporal region, in accordance with an embodiment of the present disclosure.

FIG. 10D is a graphical representation that illustrates a matching score of the first participant in spatio-temporal region, in accordance with an embodiment of the present disclosure. FIG. 10C is described in conjunction with elements from FIGS. 1, 2, 8A-8H, 10A, 10B, and 10C. With reference to FIG. 10D there is shown a graphical representation 1000D that illustrates a matching score 1014 of the first participant 204A in spatio-temporal region. The matching score 1014 is obtained by taking samples from the recorded speed profile 1006A of the first participant 204A at every time step (e.g. at every 1 s). The coordinates of sampling instants of the recorded speed profile 1006A are compared with sampling instants of the plurality of virtual speed profiles of the first participant 204A. Based on the comparison, a virtual speed profile (e.g. the virtual speed profile 1006B) of the plurality of virtual speed profiles which exhibits a lowest distance with recorded speed profile 1006A is selected. The selected virtual speed profile exhibits a highest matching score with the recorded speed profile 1006A of the first participant 204A. The lowest distance between the recorded speed profile 1006A and the virtual speed profile (e.g. the virtual speed profile 1006B) is computed by use of the equation (equation 1)

$$\text{Distance } (d) = \frac{1}{T}\sum_{t=1}^{T} \left\| p^t_{GT} - p^t_{generated} \right\| \tag{1}$$

where,

D=distance (in cm);

t=time (in seconds);

$p_{GT}$=recorded trajectory of the first participant 204A $p_{generated}$=virtual trajectory of the first participant 204A.

Figure 11A:
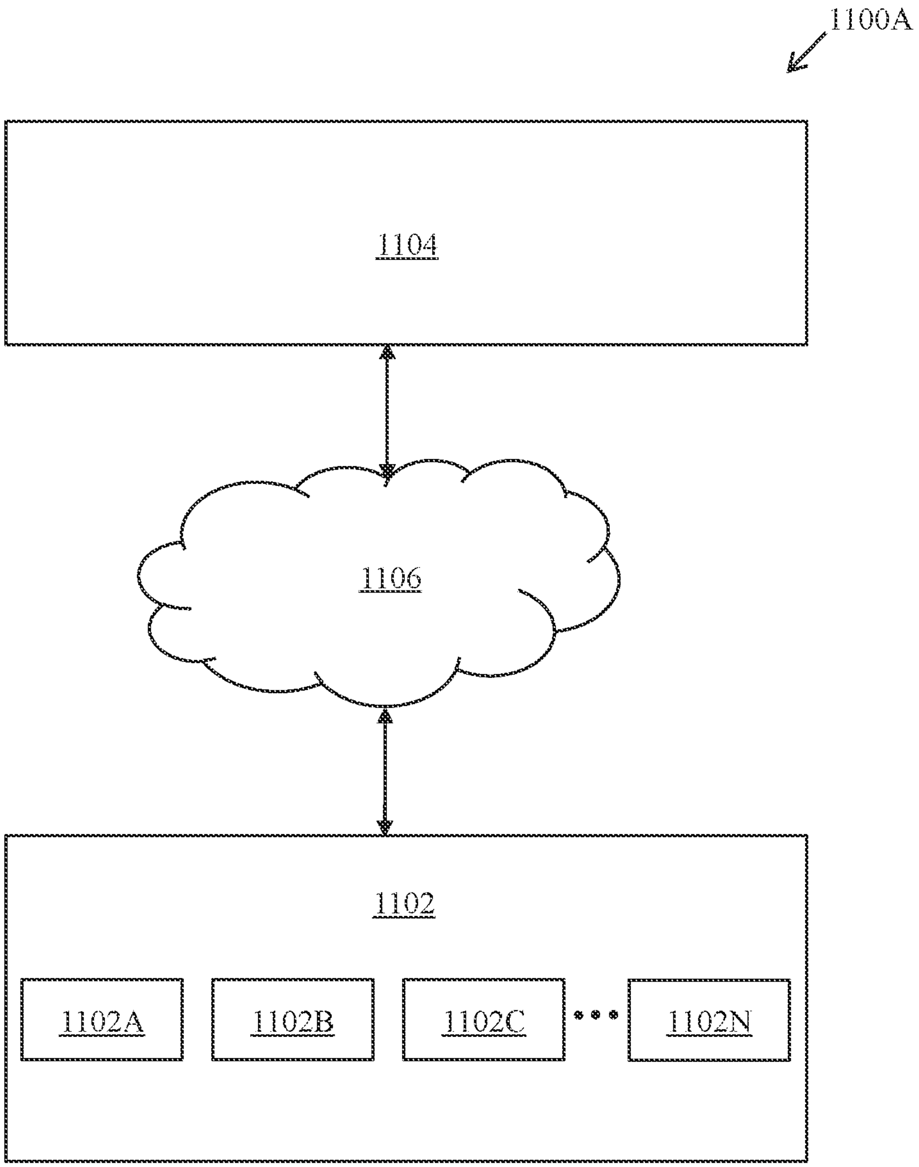
FIG. 11A is a network environment diagram of a system with a plurality of traffic participants and a server, in accordance with an embodiment of the disclosure.

FIG. 11A is a network environment diagram of a system with a plurality of traffic participants and a server, in accordance with an embodiment of the disclosure. FIG. 11A is described in conjunction with elements from FIGS. 1 and 2. With reference to FIG. 11A, there is shown a network environment of a system 1100A that includes a plurality of traffic participants 1102, a server 1104 and a communication network 1106. The plurality of traffic participants 1102 includes a first participant 1102A and one or more other participants 1102B-1102N.

The first participant 1102A and the one or more other participants 1102B-1102N corresponds to the first participant 204A and the one or more other participants 204B-204D of FIG. 2. In an implementation, each of the plurality of traffic participants 1102 corresponds to a non-autonomous vehicle (e.g. a human-driven vehicle). The non-autonomous vehicle refers to a two or more wheels vehicle. The one or more other participants 1102B-1102N also include pedestrian. In another implementation, each of the plurality of traffic participants 1102 corresponds to an autonomous vehicle (e.g. a robotic vehicle or a driver-less vehicle). In a yet another implementation, each of the plurality of traffic participants 1102 corresponds to a semi-autonomous vehicle.

The server 1104 includes suitable logic, circuitry, interfaces, and/or code that is configured to receive a plurality of collision risk updates from the plurality of traffic participants 1102 via the communication network 1106. The server 1104 is located on the side of an automotive insurance provider. The received plurality of collision risk updates are used to detect if and how the plurality of traffic participants 1102 are inclined with respect to each other and negotiate conflict situations, such as merging traffic, exiting a motorway or unsignalized intersections. The received plurality of collision risk updates are further used to estimate an actual maneuver of a traffic participant such as the first participant 1102A. Thereafter, based on the HD map of the GNSS receiver 1118B, the actual maneuver of the first participant 1102A is used to verify if the first participant 1102A complies with traffic rules (e.g. yield traffic sign or give the way to the right rule) regulating interactions among the plurality of traffic participants 1102. Based on the information, a policy premium is provided to the first participant 1102A.

The communication network 1106 is configured to transmit the plurality of collision risk updates from the first participant 1102A to the server 1104. Examples of the communication network 1106 may include, but are not limited to, the internet, a vehicular ad-hoc network (VANET), intelligent vehicular ad-hoc network (InVANET), a wireless sensor network (WSN), a cloud network, and/or a Wireless Fidelity (Wi-Fi™) network.

Figure 11B:
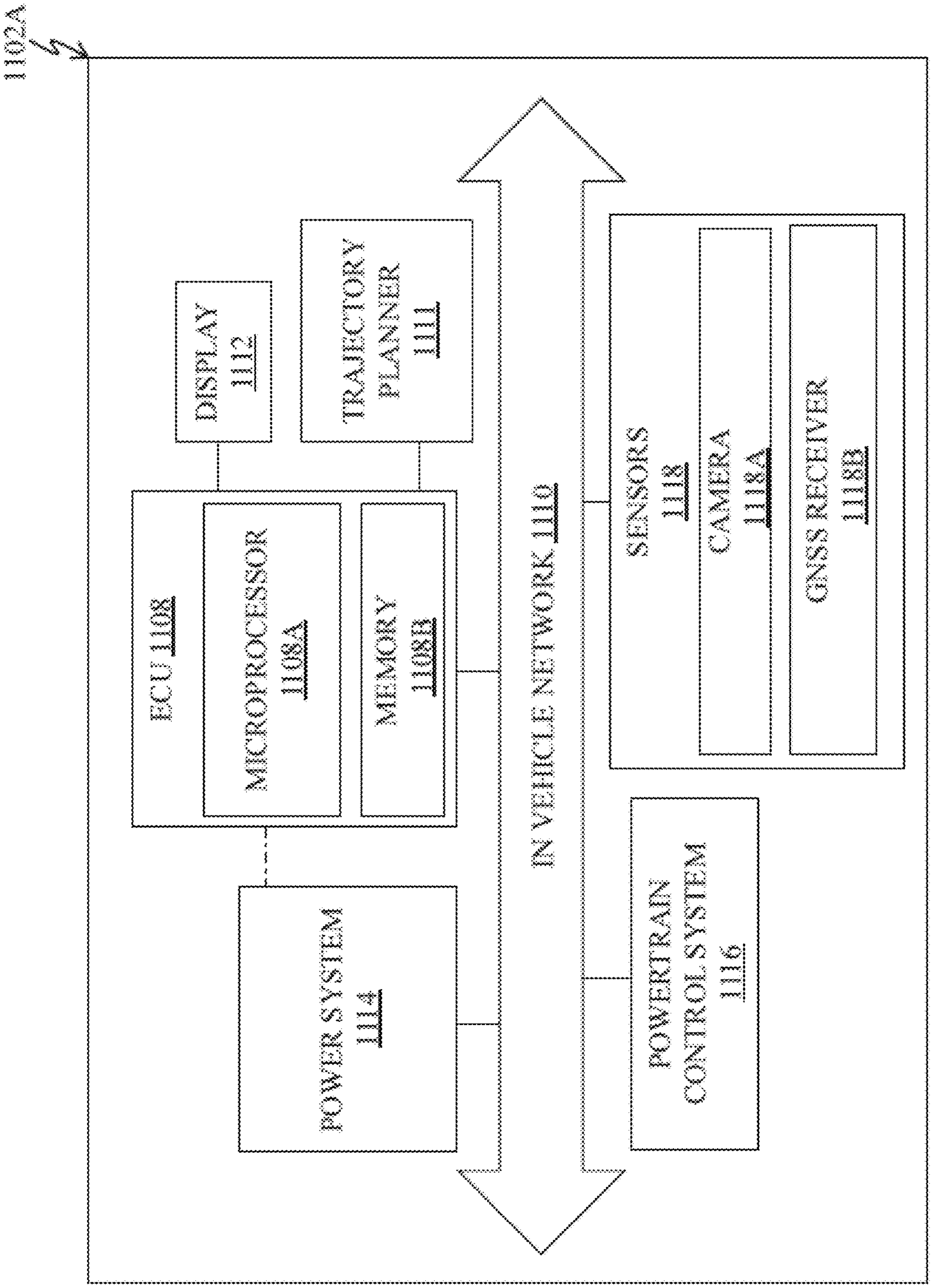
FIG. 11B is a block diagram that illustrates various exemplary components of the first participant, in accordance with an embodiment of the disclosure.

FIG. 11B is a block diagram that illustrates various exemplary components of the first participant, in accordance with an embodiment of the disclosure. FIG. 11B is described in conjunction with elements from FIGS. 1, 2, and 11A. With reference to FIG. 11B, there is shown the first participant 1102A that includes an electronic control unit (ECU) 1108, an in-vehicle network 1110, a display 1112, a power system 1114, a power strain control system 1116, and a plurality of sensors 1118. The electronic control unit 1108 includes a microprocessor 1108A and a memory 1108B. The plurality of sensors 1118 includes a camera 1118A and a GNSS receiver 1118B.

The electronic control unit 1108 includes suitable logic, circuitry, interfaces, and/or code that is configured to monitor and optimize the performance of the power system 1114.

The microprocessor 1108A of the electronic control unit 1108 includes suitable logic, circuitry, interfaces, and/or code that is configured to execute a set of instructions stored in the memory 1108B. Examples of the microprocessor 1108A includes, but are not limited to, a Reduced Instruction Set Computing (RISC) processor, an Application-Specific Integrated Circuit (ASIC) processor, a Complex Instruction Set Computing (CISC) processor, an Explicitly Parallel Instruction Computing (EPIC) processor, a Very Long Instruction Word (VLIW) processor, a microcontroller, a central processing unit (CPU), a graphics processing unit (GPU), a state machine, and/or other processors or circuits.

The memory 1108B includes suitable logic, circuitry, and/or interfaces that is configured to store a machine code and/or a set of instructions with at least one code section executable by the microprocessor 1108A. The memory 1108B is further configured to store trajectory generation algorithm, one or more text-to-speech conversion algorithms, one or more speech-generation algorithms, audio data that corresponds to various buzzer sounds, and/or other data. Examples of implementation of the memory 1108B may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory.

The in-vehicle network 1110 includes a medium through which the various control units, components, or systems of the first participant 1102A, such as the electronic control unit 1108, the power strain control system 1116, and the plurality of sensors 1118 communicate with each other. Examples of the wired and wireless communication protocols for the in-vehicle network 1110 may include, but are not limited to, a vehicle area network (VAN), a CAN bus, Domestic Digital Bus (D2B), Time-Triggered Protocol (TTP), FlexRay, IEEE 1394, Inter-Integrated Circuit (I2C), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The trajectory planner 1111 includes suitable logic, circuitry, and/or interfaces that is configured to generate and store the plurality of virtual trajectories for each of the plurality of traffic participants 1102. The trajectory planner 1111 is communicatively coupled to the electronic control unit 1108. Examples of the trajectory planner 1111 includes, but not limited to, a computing device, a microprocessor, a microcontroller, a central processing unit (CPU), a graphics processing unit (GPU), a state machine, and/or other processors or circuits.

The display 1112 refers to a display screen to display different kind of information to the first participant 1102A. The display 1112 may refer to a touch screen display. The display 1112 is communicatively coupled to the microprocessor 1108A. Examples of the display 1112 may include, but are not limited to a heads-up display (HUD) or a head-up display with an augmented reality system (AR-HUD), a driver information console (DIC), a projection-based display, a display of the head unit, a see-through display, a smart-glass display, and/or an electro-chromic display. The AR-HUD may be a combiner-based AR-HUD. The display 1112 may be a transparent or a semi-transparent display.

The power system 1114 is configured to provide a power backup to the various components of the first participant 1102A. In an example, the first participant 1102A is an autonomous vehicle then the power system 1114 is configured to provide a voltage for the various components of the first participant 1102A. The power system 1114 corresponds to power electronic device, and may include a microcontroller that is communicatively coupled (shown by dotted lines) to the electronic control unit 1108. The power system 1114 is further communicatively coupled to the in-vehicle network 1110.

The powertrain control system 1116 is configured to control an ignition, a fuel injection, and/or a fuel emission of the first participant 1102A.

The plurality of sensors 1118 corresponds to the plurality of sensors 202 of FIG. 2. Similarly, the camera 1118A and the GNSS receiver 1118B correspond to the camera 202A and the GNSS receiver 202B, respectively.

It is to be understood by a person of ordinary skill in the art that the first participant 1102A may also include other suitable sensors, components or systems such as audio/video interface, but these are not described here for sake of brevity.

In operation, the trajectory planner 1111 is configured to estimate an accident risk level of a road traffic participant. The road traffic participant is a first participant among a plurality of road traffic participants. The plurality of road traffic participants includes the first participant and one or more other participants. For estimating the accident risk level of the first participant, the trajectory planner 1111 is configured to generate a plurality of virtual trajectories of the first participant based on the following: a recorded initial position of the first participant, a recorded final position of the first participant, and a recorded initial position of each of the one or more other participants. Each of the virtual trajectories of the first participant running from the recorded initial position of the first participant to the recorded final position of the first participant. The plurality of virtual trajectories of the first participant are associated one-to-one with a plurality of virtual behaviors of the first participant. The trajectory planner 1111 is further configured to identify among the plurality of virtual trajectories of the first participant, a virtual trajectory that is most similar to a recorded trajectory of the first participant, the recorded trajectory of the first participant running from the recorded initial position to the recorded final position of the first participant. The trajectory planner 1111 is further configured to estimate the accident risk level based on the virtual behavior associated with the identified virtual trajectory. The trajectory planner 1111 is further configured to generate the plurality of virtual trajectories of the first participant based on generating for each of the plurality of virtual behaviors of the first participant a respective virtual trajectory of the first participant based on the respective virtual behavior of the first participant. The trajectory planner 1111 is further configured to generate the plurality of virtual trajectories of the first participant based on generating for each of the plurality of virtual behaviors of the first participant a respective virtual trajectory of the first participant based on the recorded initial position of each of the one or more other participants. The trajectory planner 1111 is further configured to generate the plurality of virtual trajectories of the first participant based on generating for each of the one or more other participants a virtual final position. The trajectory planner 1111 is further configured to generate the plurality of virtual trajectories of the first participant based on generating a first virtual trajectory of the first participant based on a first virtual behavior from the plurality of behaviors of the first participant, the first virtual trajectory of the first participant is a first one of the plurality of virtual trajectories of the first participant. The trajectory planner 1111 is further configured to generate the plurality of virtual trajectories of the first participant based on generating for each of the one or more other participants a virtual trajectory of the respective other participant based on a virtual behavior of the respective other participant, the virtual trajectory of the respective other participant running from the recorded initial position of the respective participant to the virtual final position of the respective participant. The trajectory planner 1111 is further configured to generate the plurality of virtual trajectories of the first participant based on identifying one or more proximity zones based on the first virtual trajectory of the first participant and based on the virtual trajectory of each of the one or more other participants, each proximity zone being a spatio-temporal region in which the first participant is in a proximity with at least one of the other one or more participants and for each of the one or more proximity zones and for each of one or more further virtual behaviours from the plurality of virtual behaviors of the first participant, generating a further one of the virtual trajectories of the first participant based on the respective proximity zone and based on the respective further virtual behavior. The trajectory planner 1111 is further configured to generate for each of the one or more other participants a virtual final position based on generating the respective virtual final position based on a recorded initial position of the respective other participant. The trajectory planner 1111 is further configured to generate the respective virtual final position is based further on a map of an area that includes the recorded initial position of the first participant and the recorded initial position of each of the other participants. The trajectory planner 1111 is further configured to generate the respective virtual final position is based further on traffic rule information, which is information about traffic rules applicable in the area. The trajectory planner 1111 is further configured to estimate the accident risk level is further based on the traffic rule information.

Figure 11C:
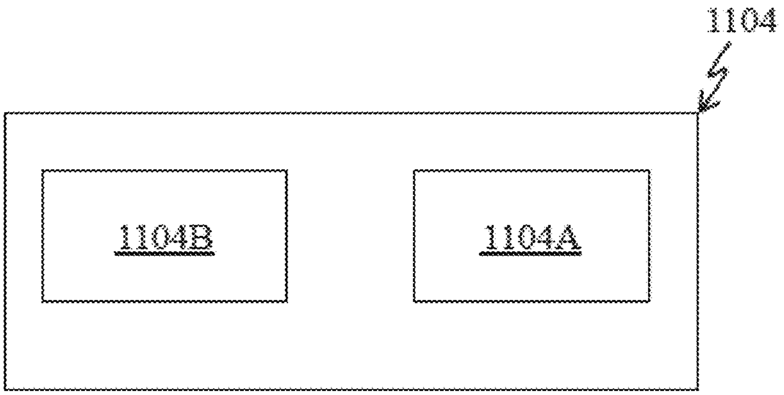
FIG. 11C is a block diagram that illustrates various exemplary components of the server, in accordance with an embodiment of the disclosure.

FIG. 11C is a block diagram that illustrates various exemplary components of the server, in accordance with an embodiment of the present disclosure. FIG. 11C is described in conjunction with elements from FIGS. 1, 2, 11A, and 11B. With reference to FIG. 11C, there is shown the server 1104. The server 1104 includes a microprocessor 1104A, and a memory 1104B.

The microprocessor 1104A includes suitable logic, circuitry, interfaces, and/or code that is configured to execute a set of instructions stored in the memory 1104B. Examples of the microprocessor 1104A includes, but are not limited to, a Reduced Instruction Set Computing (RISC) processor, an Application-Specific Integrated Circuit (ASIC) processor, a Complex Instruction Set Computing (CISC) processor, an Explicitly Parallel Instruction Computing (EPIC) processor, a Very Long Instruction Word (VLIW) processor, a microcontroller, a central processing unit (CPU), a graphics processing unit (GPU), a state machine, and/or other processors or circuits.

The memory 1104B includes suitable logic, circuitry, and/or interfaces that is configured to store a machine code and/or a set of instructions with at least one code section executable by the microprocessor 1104A. Examples of implementation of the memory 1104B may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory.

Figure 12:
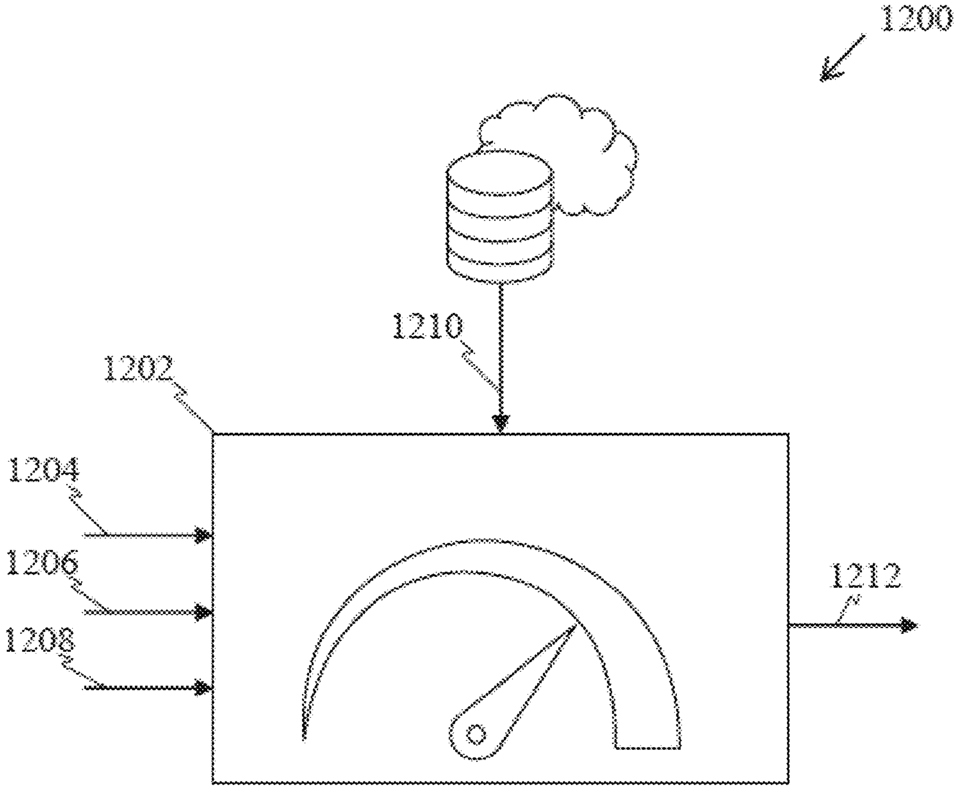
FIG. 12 is an exemplary implementation that illustrates calculation of a normalized risk feature for the first participant, in accordance with an embodiment of the present disclosure.

FIG. 12 is an exemplary implementation that illustrates calculation of a normalized risk feature for the first participant, in accordance with an embodiment of the present disclosure. FIG. 12 is described in conjunction with elements from FIGS. 1, 2, 11A, 11B, and 11C. With reference to FIG. 12 there is shown an exemplary implementation 1200 that illustrates calculation of a normalized risk feature for the first participant 204A. The exemplary implementation 1200 includes an accident risk evaluator 1202, TW/GW ratios 1204, broken traffic rules 1206, number of the accident taken care 1208, and a plurality of population risk features 1210. There is further shown an overall accident risk 1212.

The accident risk evaluator 1202 evaluates the overall accident risk 1212. The overall accident risk 1212 may also be referred as a collision risk of the first participant 204A. The overall accident risk 1212 is evaluated based on collision risk features such as the TW/GW ratios 1204, the number of broken traffic rules 1206, the number of accident taken care 1208, and the plurality of population risk features 1210 of the first participant 204A by use of the equation (equation 2 and equation 3).

$$RF_{norm} = \frac{RF_{user} - RF_{population}}{RF_{population}} \quad (2)$$

$$CR = \alpha_0 TW_{norm} + \alpha_1 \frac{BTR}{\text{km}_{norm}} + \alpha_2 N_{collision_{norm}} \quad (3)$$

Where, $RF_{norm}$=normalized risk feature of the first participant 204A, $RF_{user}$=collision risk feature of the first participant 204A, $RF_{population}$=population risk feature of the first participant 204A, CR=collision risk of the first participant 204A, $\alpha_0 TW_{norm}$=count of take the way (TW)

$\alpha_1 BTR/km_{norm}$=count of broken traffic rules $\alpha_2 Ncollision_{norm}$=count of collision taken care The matching of the recorded trajectory with the virtual trajectory of the first participant 204A provides collision risk features such as the TW/GW ratios 1204, the number of broken traffic rules 1206, the number of accident taken care 1208 which are used to derive the collision risk (CR) of the first participant 204A by use of the equation 2 and the equation 3.

In another implementation, the collision risk of the first participant 204A may be calculated by comparison of the collision risk features (or specific risk features) of the first participant 204A to the one or more other participants 204B-204D. For example, if the first participant 204A is identified to often take the way at the intersection point (which leads to high TW/GW ratio) and at the same time, breaks the yield traffic rule (which leads to high TR index), then collision risk of the first participant 204A results into a high value and driving style of the first participant 204A is considered as very risky.

There are many other technical implementations and practical applications of estimating the accident risk level of the first participant 1102A with the one or more other participants 1102B-1102N. In an example, once the accurate accident risk level is estimated, the microprocessor 1108A in a vehicle may be configured to generate an alarm at the vehicle (i.e. the first participant 1102A) to avoid an accident with the one or more other participants 1102B-1102N. The use of the trajectory planner 1111 in the first participant 1102A leads to a safe driving of the first participant 1102A as the microprocessor 1108A causes the trajectory planner 1111 to generate the alarm proactively at the vehicle (i.e. the first participant 1102A) to avoid the accident with the one or more other participants 1102B-1102N. In another example, in case of autonomous vehicles (i.e. robotic vehicles), the use of the trajectory generator 1111 improves the functioning of the vehicles itself. For instance, by leveraging the accurate accident risk level, any potential damage to the vehicle is avoided, for example, due to collision or crash, which might have happened otherwise, by proactive action, like applying brakes at right moment, choosing right direction, adjusting speed, and the like. Moreover, one vehicle can communicate with another vehicle in a v2v communication to help the other vehicle to apply appropriate controls, such as brake, adjusting speed etc. to avoid any accident proactively. In yet another example, in a scenario of hundreds to thousands of traffic participants, a server (e.g. the server 1104) owned by an automotive insurance provider may be configured to automatically update a database, in which the accident risk level of all the traffic participants, is updated. This helps to generate accurate as well as factually and logically accurate pricing for policy holders who own policy for such vehicles. Moreover, the server 1104 may also identify a real reason of the accident which may be either due to less interactions or negotiations between the first participant 1102A and the one or more other participants 1102B-1102N or traffic rule breaking and the like. Additionally, the server 1104 may also identify who is responsible for the accident either the first participant 1102A or the one or more other participants 1102B-1102N, and a notification can be sent to a concerned user.

Modifications to embodiments of the present disclosure described in the foregoing are possible without departing from the scope of the present disclosure as defined by the accompanying claims. Expressions such as “including”, “comprising”, “incorporating”, “have”, “is” used to describe and claim the present disclosure are intended to be construed in a non-exclusive manner, namely allowing for items, components or elements not explicitly described also to be present. Reference to the singular is also to be construed to relate to the plural. The word “exemplary” is used herein to mean “serving as an example, instance or illustration”. Any embodiment described as “exemplary” is not necessarily to be construed as preferred or advantageous over other embodiments or to exclude the incorporation of features from other embodiments. The word “optionally” is used herein to mean “is provided in some embodiments and not provided in other embodiments”. It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

What is claimed is:

1. A method of estimating an accident risk level of a road traffic participant, the road traffic participant being a first participant among a plurality of road traffic participants, the plurality of road traffic participants including the first participant and one or more other participants, the method comprising:

generating a plurality of virtual trajectories of the first participant based on at least one of: a recorded initial position of the first participant, a recorded final position of the first participant, and a recorded initial position of each of the one or more other participants, each of the plurality of virtual trajectories of the first participant running from the recorded initial position of the first participant to the recorded final position of the first participant, the plurality of virtual trajectories of the first participant being associated one-to-one with a plurality of virtual behaviors of the first participant, wherein the plurality of virtual behaviors of the first participant correspond to different maneuvers performed by the first participant from the recorded initial position to the recorded final position, while having interactions or negotiations with the one or more other participants;

identifying, among the plurality of virtual trajectories of the first participant, a virtual trajectory that is most similar to a recorded trajectory of the first participant, the recorded trajectory of the first participant running from the recorded initial position to the recorded final position of the first participant;

estimating the accident risk level based on the virtual behavior associated with the identified virtual trajectory, wherein the accident risk level is calculated based on take the way/give the way (TW/GW) ratios associated with the first participant, a number of traffic rules broken by the first participant, a number of accidents taken care by the first participant, and a plurality of population risk features associated with the first participant;

an autonomous vehicle of the first participant automatically taking proactive action based on the estimated accident risk level; and initiating a communication between the first participant and the one or more other participants to apply appropriate controls to avoid collisions, based on the estimated accident risk level.

2. The method of claim 1, wherein generating the plurality of virtual trajectories of the first participant comprises:

generating for each of the plurality of virtual behaviors of the first participant a respective virtual trajectory of the first participant based on the respective virtual behavior of the first participant.

3. The method of claim 1, wherein generating the plurality of virtual trajectories of the first participant comprises:

generating for each of the plurality of virtual behaviors of the first participant a respective virtual trajectory of the first participant based further on the recorded initial position of each of the one or more other participants.

4. The method of claim 1, wherein generating the plurality of virtual trajectories of the first participant comprises:

generating for each of the one or more other participants a virtual final position;

generating a first virtual trajectory of the first participant based on a first virtual behavior from the plurality of behaviors of the first participant, the first virtual trajectory of the first participant being a first one of the plurality of virtual trajectories of the first participant;

generating for each of the one or more other participants a virtual trajectory of the respective other participant based on a virtual behavior of the respective other participant, the virtual trajectory of the respective other participant running from the recorded initial position of the respective participant to the virtual final position of the respective participant;

identifying one or more proximity zones based on the first virtual trajectory of the first participant and based on the virtual trajectory of each of the one or more other participants, each proximity zone being a spatio-temporal region in which the first participant is in a proximity with at least one of the other one or more participants; and for each of the one or more proximity zones and for each of one or more further virtual behaviors from the plurality of virtual behaviors of the first participant, generating a further one of the virtual trajectories of the first participant based on the respective proximity zone and based on the respective further virtual behavior.

5. The method of claim 4, wherein generating for each of the one or more other participants a virtual final position comprises:

generating the respective virtual final position based on a recorded initial position of the respective other participant.

6. The method of claim 5, wherein generating the respective virtual final position is based further on:

a map of an area that includes the recorded initial position of the first participant and the recorded initial position of each of the other participants.

7. The method of claim 6, wherein generating the respective virtual final position is based further on:

traffic rule information, which is information about traffic rules applicable in the area.

8. The method of claim 7, wherein estimating the accident risk level is further based on the traffic rule information.

9. A computer program comprising a program code which when executed by a computer causes the computer to perform the method of claim 1.

10. The method of claim 1, further comprising:

generating an alarm, based on the estimated accident risk level, for the first participant so that the first participant avoids an accident with the one or more other participants.

11. The method of claim 1, further comprising:

update a database with the estimated accident risk level; and determine a pricing for an insurance policy associated with the first participant based on the database.

12. The method of claim 1, wherein the interactions or negotiations between the first participant and the one or more other participants comprise the first participant allowing the one or more other participants to pass through an intersection first in order to avoid a collision.

13. The method of claim 1, wherein the interactions or negotiations between the first participant and the one or more other participants comprise the one or more other participants allowing the first participant to pass through an intersection first in order to avoid a collision.

14. The method of claim 1, wherein the appropriate controls are applied to the one or more other participants to avoid collisions.

15. The method of claim 14, wherein the appropriate controls are autonomously applied by the one or more other participants based on the estimated accident risk level.

16. A non-transitory computer-readable medium carrying a program code which when executed by a computer causes the computer to perform a method of estimating an accident risk level of a road traffic participant, the road traffic participant being a first participant among a plurality of road traffic participants, the plurality of road traffic participants including the first participant and one or more other participants, the method comprising:

generating a plurality of virtual trajectories of the first participant based on at least one of: a recorded initial position of the first participant, a recorded final position of the first participant, and a recorded initial position of each of the one or more other participants, each of the plurality of virtual trajectories of the first participant running from the recorded initial position of the first participant to the recorded final position of the first participant, the plurality of virtual trajectories of the first participant being associated one-to-one with a plurality of virtual behaviors of the first participant, wherein the plurality of virtual behaviors of the first participant correspond to different maneuvers performed by the first participant from the recorded initial position to the recorded final position, while having interactions or negotiations with the one or more other participants;

identifying, among the plurality of virtual trajectories of the first participant, a virtual trajectory that is most similar to a recorded trajectory of the first participant, the recorded trajectory of the first participant running from the recorded initial position to the recorded final position of the first participant;

estimating the accident risk level based on the virtual behavior associated with the identified virtual trajectory, wherein the accident risk level is calculated based on take the way/give the way (TW/GW) ratios associated with the first participant, a number of traffic rules broken by the first participant, a number of accidents taken care by the first participant, and a plurality of population risk features associated with the first participant;

an autonomous vehicle of the first participant automatically taking proactive action based on the estimated accident risk level; and initiating a communication between the first participant and the one or more other participants to apply appropriate controls to avoid collisions, based on the estimated accident risk level.

17. A system for operating a first participant among a plurality of road traffic participants, the system comprising at least one processor coupled to memory, the memory storing instructions, which when executed by the processor cause the system to:

generating a plurality of virtual trajectories of the first participant based on at least one of a recorded initial position of the first participant, a recorded final position of the first participant, and a recorded initial position of each of one or more other road traffic participants, each of the plurality of virtual trajectories of the first participant running from the recorded initial position of the first participant to the recorded final position of the first participant, the plurality of virtual trajectories of the first participant being associated one-to-one with a plurality of virtual behaviors of the first participant, wherein the plurality of virtual behaviors of the first participant correspond to different maneuvers performed by the first participant from the recorded initial position to the recorded final position, while having interactions or negotiations with the one or more other participants;

identifying, among the plurality of virtual trajectories of the first participant, a virtual trajectory that is most similar to a recorded trajectory of the first participant, the recorded trajectory of the first participant running from the recorded initial position to the recorded final position of the first participant;

estimating the accident risk level based on the virtual behavior associated with the identified virtual trajectory, wherein the accident risk level is calculated based on take the way/give the way (TW/GW) ratios associated with the first participant, a number of traffic rules broken by the first participant, a number of accidents taken care by the first participant, and a plurality of population risk features associated with the first participant;

an autonomous vehicle of the first participant automatically taking proactive action based on the estimated accident risk level; and initiating a communication between the first participant and the one or more other participants to apply appropriate controls to avoid collisions, based on the estimated accident risk level.

18. The system according to claim 17, the system comprising an autonomous vehicle configured as the first participant, the autonomous vehicle comprising the at least one processor coupled to memory, the memory further comprising instructions, which when executed by the processor cause the processor to control the autonomous vehicle to take proactive action based on the estimated accident risk level.

19. The system according to claim 18, wherein the proactive action comprises autonomously applying brakes of the autonomous vehicle, changing a direction of the autonomous vehicle, or adjusting a speed of the autonomous vehicle.

* * * * *